(12) United States Patent
Smithson et al.

(10) Patent No.: US 7,976,426 B2
(45) Date of Patent: Jul. 12, 2011

(54) CONTINUOUSLY VARIABLE TRANSMISSION

(75) Inventors: Robert A Smithson, Cedar Park, TX (US); Brad P Pohl, Leander, TX (US); Oronde J Armstrong, Austin, TX (US); Donald C Miller, Fallbrook, CA (US); Daniel J Dawe, Austin, TX (US); Fernand A Thomassy, Liberty Hill, TX (US); Matthew P Simister, Austin, TX (US); Wesley R Poth, Leander, TX (US); Jon M Nichols, Georgetown, TX (US); Charles B Lohr, Austin, TX (US)

(73) Assignee: Fallbrook Technologies Inc., San Diego, CA (US)

( * ) Notice: Subject to any disclaimer, the term of this patent is extended or adjusted under 35 U.S.C. 154(b) by 986 days.

(21) Appl. No.: 11/842,050

(22) Filed: Aug. 20, 2007

(65) Prior Publication Data
US 2008/0039271 A1    Feb. 14, 2008

Related U.S. Application Data

(63) Continuation of application No. 11/243,484, filed on Oct. 4, 2005, now Pat. No. 7,762,919.

(60) Provisional application No. 60/616,399, filed on Oct. 5, 2004.

(51) Int. Cl.
*F16H 15/26* (2006.01)
(52) U.S. Cl. ............................................ 476/38; 476/67
(58) Field of Classification Search .................... 476/36, 476/38, 67
See application file for complete search history.

(56) References Cited

U.S. PATENT DOCUMENTS

| 719,595 | A | 2/1903 | Huss |
|---|---|---|---|
| 1,121,210 | A | 12/1914 | Techel |
| 1,175,677 | A | 3/1916 | Barnes |
| 1,380,006 | A | 5/1921 | Nielson |
| 1,390,971 | A | 9/1921 | Samain |

(Continued)

FOREIGN PATENT DOCUMENTS

CH    118064    12/1926

(Continued)

OTHER PUBLICATIONS

Office Action dated Aug. 14, 2009 for Chinese Patent Application No. 200500038511.1 and translation (12 pages).

(Continued)

*Primary Examiner* — William C Joyce
(74) *Attorney, Agent, or Firm* — Knobbe, Martens, Olson & Bear LLP

(57) ABSTRACT

A continuously variable transmission (CVT) having a number of tiltable ball-leg assemblies configured angularly about a longitudinal axis. Each ball-leg assembly is in contact with, and guided through a tilting motion by an axially translating shift cam having a convex shape. The convex shape of the shift cam can have a profile defined by a set of parametric equations. In one embodiment, the profile of the shift cam vary according to the location of the contact point between an idler and the ball-leg assembly as well as the amount of relative axial motion between the ball-leg assembly and the idler. In some embodiments, the profile of the shift cam can be configured to control the axial translation of the idler relative to the change in tilt angle of the ball-leg assembly. In other embodiments, a roll-slide factor can be used to characterize the axial translation of the idler relative to the tilt angle of the ball-leg assembly.

21 Claims, 26 Drawing Sheets

U.S. PATENT DOCUMENTS

| | | |
|---|---|---|
| 1,558,222 A | 10/1925 | Beetow |
| 1,579,359 A | 4/1926 | Hallenbeck |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,858,696 A | 5/1932 | Weiss |
| 1,865,102 A | 6/1932 | Hayes |
| 1,903,228 A | 3/1933 | Thomson |
| 1,937,234 A | 11/1933 | Lansing |
| 2,060,884 A | 11/1936 | Madle |
| 2,086,491 A | 7/1937 | Dodge |
| 2,109,845 A | 3/1938 | Madle |
| 2,112,763 A | 3/1938 | Cloudsley |
| 2,152,796 A | 4/1939 | Erban |
| 2,209,254 A | 7/1940 | Ahnger |
| 2,259,933 A | 10/1941 | Holloway |
| 2,325,502 A | 7/1943 | Auguste |
| 2,469,653 A | 5/1949 | Kopp |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,883,883 A | 4/1959 | Chillson |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 3,051,020 A | 8/1962 | Hartupee |
| 3,086,704 A | 4/1963 | Hurtt |
| 3,087,348 A | 4/1963 | Kraus |
| 3,163,050 A | 12/1964 | Kraus |
| 3,176,542 A | 4/1965 | Monch |
| 3,184,983 A | 5/1965 | Kraus |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,407,687 A | 10/1968 | Hayashi |
| 3,464,281 A | 9/1969 | Hiroshi et al. |
| 3,487,726 A | 1/1970 | Burnett |
| 3,487,727 A | 1/1970 | Gustafsson |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,800,607 A | 4/1974 | Zurcher |
| 3,810,398 A | 5/1974 | Kraus |
| 3,820,416 A | 6/1974 | Kraus |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,996,807 A | 12/1976 | Adams |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,494,524 A | 1/1985 | Wagner |
| 4,496,051 A | 1/1985 | Ortner |
| 4,574,649 A | 3/1986 | Seol |
| 4,585,429 A | 4/1986 | Marier |
| 4,628,766 A | 12/1986 | De Brie Perry |
| 4,630,839 A | 12/1986 | Seol |
| 4,700,581 A | 10/1987 | Tibbals, Jr. |
| 4,735,430 A | 4/1988 | Tomkinson |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,900,046 A | 2/1990 | Aranceta-Angoitia |
| 4,909,101 A | 3/1990 | Terry |
| 4,961,477 A | 10/1990 | Sweeney |
| 5,020,384 A | 6/1991 | Kraus |
| 5,037,361 A | 8/1991 | Takahashi |
| 5,069,655 A | 12/1991 | Schivelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,451,070 A | 9/1995 | Lindsay et al. |
| 5,508,574 A | 4/1996 | Vlock |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,690,346 A | 11/1997 | Keskitalo |
| 5,746,676 A | 5/1998 | Kawase et al. |
| 5,799,541 A | 9/1998 | Arbeiter |
| 5,823,052 A | 10/1998 | Nobumoto |
| 5,846,155 A | 12/1998 | Taniguchi et al. |
| 5,899,827 A | 5/1999 | Nakano et al. |
| 5,967,933 A | 10/1999 | Valdenaire |
| 5,984,826 A | 11/1999 | Nakano |
| 6,000,707 A | 12/1999 | Miller |
| 6,006,151 A | 12/1999 | Graf |
| 6,042,132 A | 3/2000 | Suenaga et al. |
| 6,045,481 A | 4/2000 | Kumagai |
| 6,053,833 A | 4/2000 | Masaki |
| 6,053,841 A | 4/2000 | Koide et al. |
| 6,066,067 A | 5/2000 | Greenwood |
| 6,071,210 A | 6/2000 | Kato |
| 6,095,940 A | 8/2000 | Ai et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,186,922 B1 | 2/2001 | Bursal et al. |
| 6,241,636 B1 | 6/2001 | Miller |
| 6,243,638 B1 | 6/2001 | Abo et al. |
| 6,322,475 B2 | 11/2001 | Miller |
| 6,325,386 B1 | 12/2001 | Shoge |
| 6,340,067 B1 | 1/2002 | Fujiwara |
| 6,375,412 B1 | 4/2002 | Dial |
| 6,390,946 B1 | 5/2002 | Hibi et al. |
| 6,406,399 B1 | 6/2002 | Ai |
| 6,419,608 B1 | 7/2002 | Miller |
| 6,461,268 B1 | 10/2002 | Milner |
| 6,482,094 B2 | 11/2002 | Kefes |
| 6,499,373 B2 | 12/2002 | Van Cor |
| 6,532,890 B2 | 3/2003 | Chen |
| 6,551,210 B2 | 4/2003 | Miller |
| 6,575,047 B2 | 6/2003 | Reik et al. |
| 6,672,418 B1 | 1/2004 | Makino |
| 6,676,559 B2 | 1/2004 | Miller |

| | | |
|---|---|---|
| 6,679,109 B2 | 1/2004 | Gierling et al. |
| 6,682,432 B1 | 1/2004 | Shinozuka |
| 6,689,012 B2 | 2/2004 | Miller |
| 6,805,654 B2 | 10/2004 | Nishii |
| 6,931,316 B2 | 8/2005 | Joe et al. |
| 6,945,903 B2 | 9/2005 | Miller |
| 6,949,049 B2 | 9/2005 | Miller |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,086,979 B2 | 8/2006 | Frenken |
| 7,086,981 B2 | 8/2006 | Ali et al. |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,219 B2 | 5/2007 | Miller |
| 7,217,220 B2 | 5/2007 | Careau et al. |
| 7,232,395 B2 | 6/2007 | Miller et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,288,042 B2 | 10/2007 | Miller et al. |
| 7,320,660 B2 | 1/2008 | Miller |
| 7,322,901 B2 | 1/2008 | Miller et al. |
| 2001/0008192 A1 | 7/2001 | Morisawa |
| 2003/0022753 A1 | 1/2003 | Mizuno et al. |
| 2003/0221892 A1 | 12/2003 | Matsumoto et al. |
| 2004/0204283 A1 | 10/2004 | Inoue |
| 2005/0178893 A1 | 8/2005 | Miller et al. |
| 2005/0227809 A1 | 10/2005 | Bitzer et al. |
| 2006/0084549 A1 | 4/2006 | Smithson et al. |
| 2006/0108956 A1 | 5/2006 | Clark |
| 2006/0180363 A1 | 8/2006 | Uchisasai |
| 2007/0041823 A1 | 2/2007 | Miller |
| 2007/0049450 A1 | 3/2007 | Miller |
| 2007/0142161 A1 | 6/2007 | Miller |
| 2007/0155567 A1 | 7/2007 | Miller et al. |
| 2007/0155580 A1 | 7/2007 | Nichols et al. |
| 2007/0167275 A1 | 7/2007 | Miller |
| 2007/0167277 A1 | 7/2007 | Miller |
| 2007/0167278 A1 | 7/2007 | Miller |
| 2007/0167279 A1 | 7/2007 | Miller |
| 2007/0167280 A1 | 7/2007 | Miller |
| 2007/0179013 A1 | 8/2007 | Miller et al. |
| 2007/0197337 A1 | 8/2007 | Miller et al. |
| 2007/0270265 A1 | 11/2007 | Miller et al. |
| 2007/0270266 A1 | 11/2007 | Miller et al. |
| 2007/0270267 A1 | 11/2007 | Miller et al. |
| 2007/0270268 A1 | 11/2007 | Miller et al. |
| 2007/0270269 A1 | 11/2007 | Miller et al. |
| 2007/0270270 A1 | 11/2007 | Miller et al. |
| 2007/0270271 A1 | 11/2007 | Miller et al. |
| 2007/0270272 A1 | 11/2007 | Miller et al. |
| 2007/0270278 A1 | 11/2007 | Miller et al. |
| 2007/0275809 A1 | 11/2007 | Miller et al. |
| 2007/0281819 A1 | 12/2007 | Miller et al. |
| 2007/0287577 A1 | 12/2007 | Miller |
| 2007/0287578 A1 | 12/2007 | Miller |
| 2007/0287579 A1 | 12/2007 | Miller et al. |
| 2007/0287580 A1 | 12/2007 | Miller |
| 2008/0032852 A1 | 2/2008 | Smithson et al. |
| 2008/0032853 A1 | 2/2008 | Smithson et al. |
| 2008/0032854 A1 | 2/2008 | Smithson et al. |
| 2008/0034585 A1 | 2/2008 | Smithson et al. |
| 2008/0034586 A1 | 2/2008 | Smithson et al. |
| 2008/0039269 A1 | 2/2008 | Smithson et al. |
| 2008/0039270 A1 | 2/2008 | Smithson et al. |
| 2008/0039272 A1 | 2/2008 | Smithson et al. |
| 2008/0039273 A1 | 2/2008 | Smithson et al. |
| 2008/0039274 A1 | 2/2008 | Smithson et al. |
| 2008/0039275 A1 | 2/2008 | Smithson et al. |
| 2008/0039276 A1 | 2/2008 | Smithson et al. |
| 2008/0039277 A1 | 2/2008 | Smithson et al. |
| 2008/0040008 A1 | 2/2008 | Smithson et al. |
| 2008/0200300 A1 | 8/2008 | Smithson et al. |
| 2009/0164076 A1 | 6/2009 | Vasiliotis et al. |
| 2009/0280949 A1 | 11/2009 | Lohr |
| 2009/0312145 A1 | 12/2009 | Pohl et al. |
| 2010/0056322 A1 | 3/2010 | Thomassy |
| 2010/0093479 A1 | 4/2010 | Carter et al. |
| 2010/0093480 A1 | 4/2010 | Pohl et al. |
| 2010/0093485 A1 | 4/2010 | Pohl et al. |
| 2010/0131164 A1 | 5/2010 | Carter et al. |
| 2010/0264620 A1 | 10/2010 | Miles et al. |
| 2010/0267510 A1 | 10/2010 | Nichols et al. |

FOREIGN PATENT DOCUMENTS

| | | |
|---|---|---|
| CN | 2084131 U | 8/1989 |
| CN | 1157379 A | 8/1997 |
| DE | 498 701 | 5/1930 |
| DE | 1171692 | 6/1964 |
| DE | 2 310 880 | 9/1974 |
| DE | 2 136 243 | 1/1975 |
| DE | 2436496 | 2/1975 |
| DE | 263566 | 1/1989 |
| DE | 39 40 919 A1 | 6/1991 |
| DE | 10155372 A1 | 5/2003 |
| EP | 0 432 742 | 12/1990 |
| EP | 635639 A1 | 1/1995 |
| EP | 0638741 | 2/1995 |
| EP | 1136724 | 9/2001 |
| EP | 1811202 A1 | 7/2007 |
| FR | 620375 | 4/1927 |
| FR | 2590638 | 5/1987 |
| GB | 592320 | 9/1947 |
| GB | 906 002 A | 9/1962 |
| GB | 919430 A | 2/1963 |
| GB | 1 376 057 | 12/1974 |
| GB | 2 035 482 | 6/1980 |
| GB | 2 080 452 | 8/1982 |
| JP | 42-2844 | 2/1967 |
| JP | 47-29762 | 11/1972 |
| JP | 48-54371 | 7/1973 |
| JP | 49-12742 | 3/1974 |
| JP | 51-25903 | 8/1976 |

| | | |
|---|---|---|
| JP | 51-150380 | 12/1976 |
| JP | 47-20535 | 8/1977 |
| JP | 53 048166 | 1/1978 |
| JP | 55-135259 | 4/1979 |
| JP | 59069565 | 4/1984 |
| JP | 61-173722 | 10/1986 |
| JP | 63219953 | 9/1988 |
| JP | 02157483 | 6/1990 |
| JP | 02271142 | 6/1990 |
| JP | 03-149442 | 6/1991 |
| JP | 04-272553 | 9/1992 |
| JP | 52-35481 | 9/1993 |
| JP | 08170706 A | 7/1996 |
| JP | 09024743 A | 1/1997 |
| JP | 411063130 | 3/1999 |
| JP | 2001-027298 | 1/2001 |
| JP | 2003-056662 | 2/2003 |
| JP | 2003-336732 | 11/2003 |
| JP | 2004162652 A | 6/2004 |
| JP | 8-247245 | 9/2004 |
| JP | 2005/240928 A | 9/2005 |
| NE | 98467 | 7/1961 |
| TW | 582363 | 4/2004 |
| TW | 590955 | 6/2004 |
| WO | WO 02/088573 | 11/2002 |
| WO | WO 2009/157920 | 12/2009 |
| WO | WO 2010/024809 | 3/2010 |
| WO | WO 2010/044778 | 4/2010 |

OTHER PUBLICATIONS

Preliminary Notice of First Action and Search Report for Taiwanese patent application 094134761, dated Oct. 30, 2008, 3 pages.
Office Action dated Apr. 16, 2010 from U.S. Appl. No. 11/841,979, filed Aug. 20, 2007.
Office Action dated Feb. 17, 2010 from Japanese Patent Application No. 2006-508892.
Office Action dated Feb. 12, 2010 from Japanese Patent Application No. 2009-294086.
International Search Report and Written Opinion dated Feb. 2, 2010 from International Patent Application No. PCT/US2008/068929, filed on Jan. 7, 2008.
Chinese Office Action for Application No. 200580038511.1 dated Jan. 16, 2009, 12 pages.
Office Action dated Dec. 8, 2010 for U.S. Appl. No. 11/842,007.
Office Action dated Nov. 15, 2010 for U.S. Appl. No. 11/842,050.

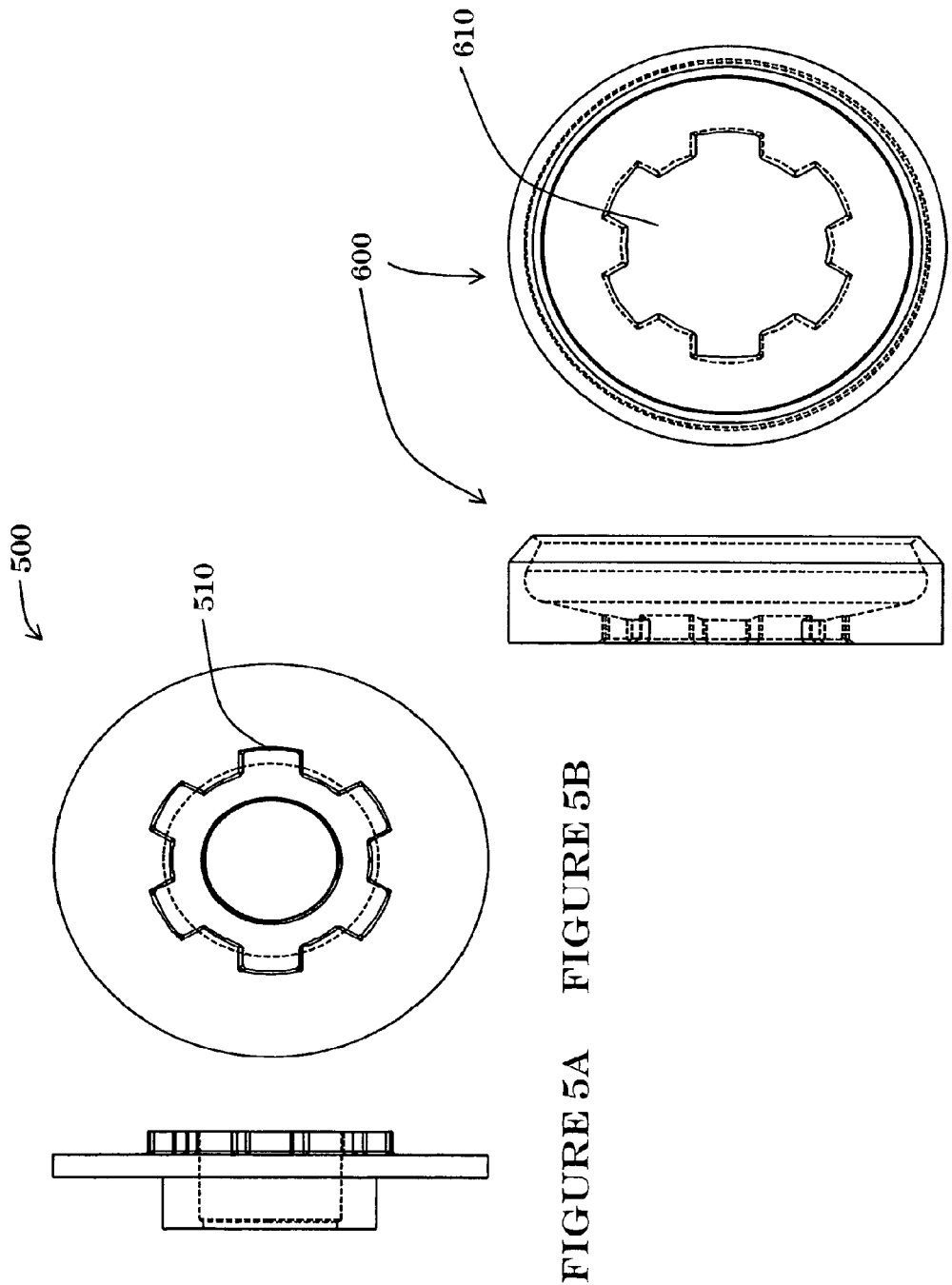

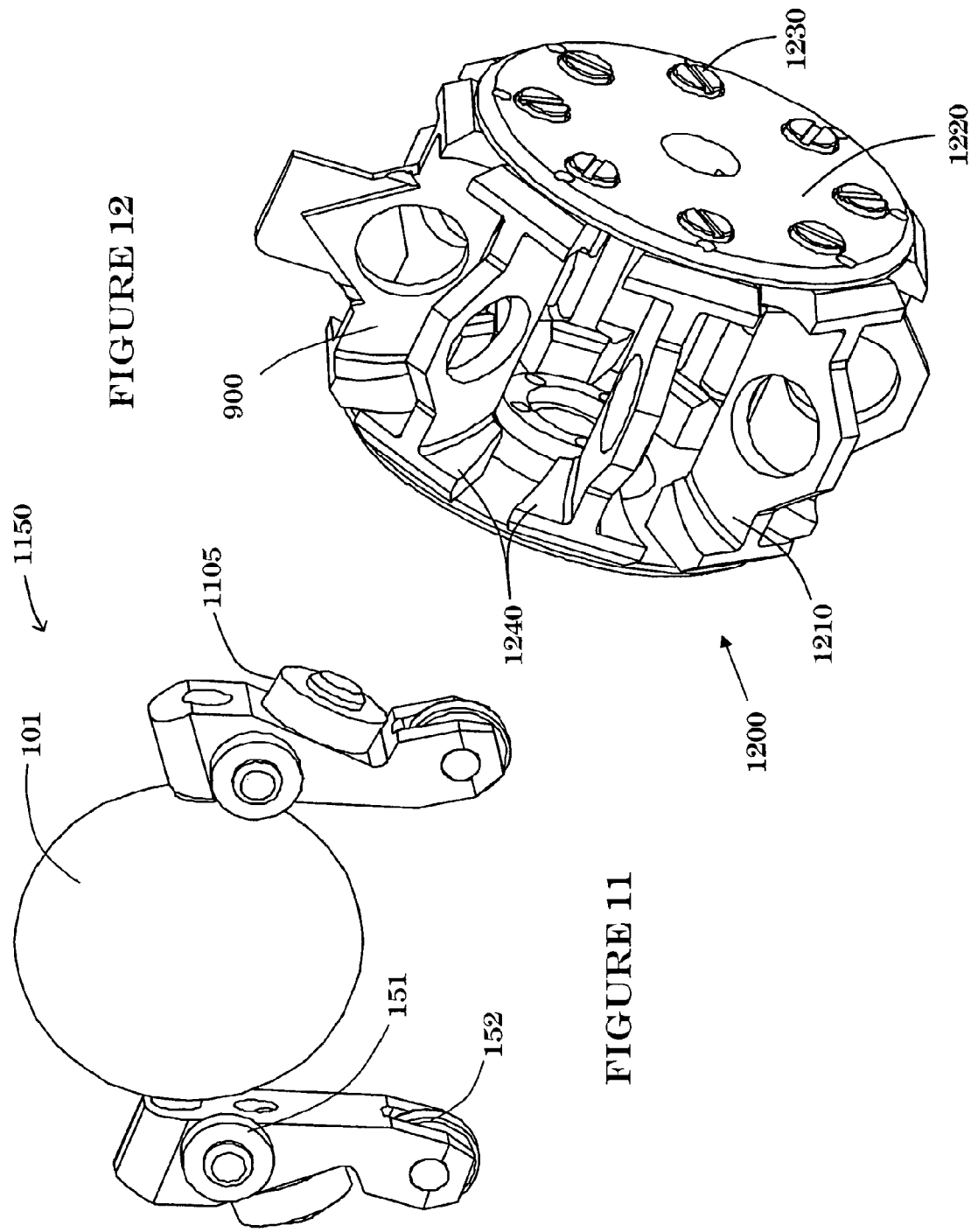

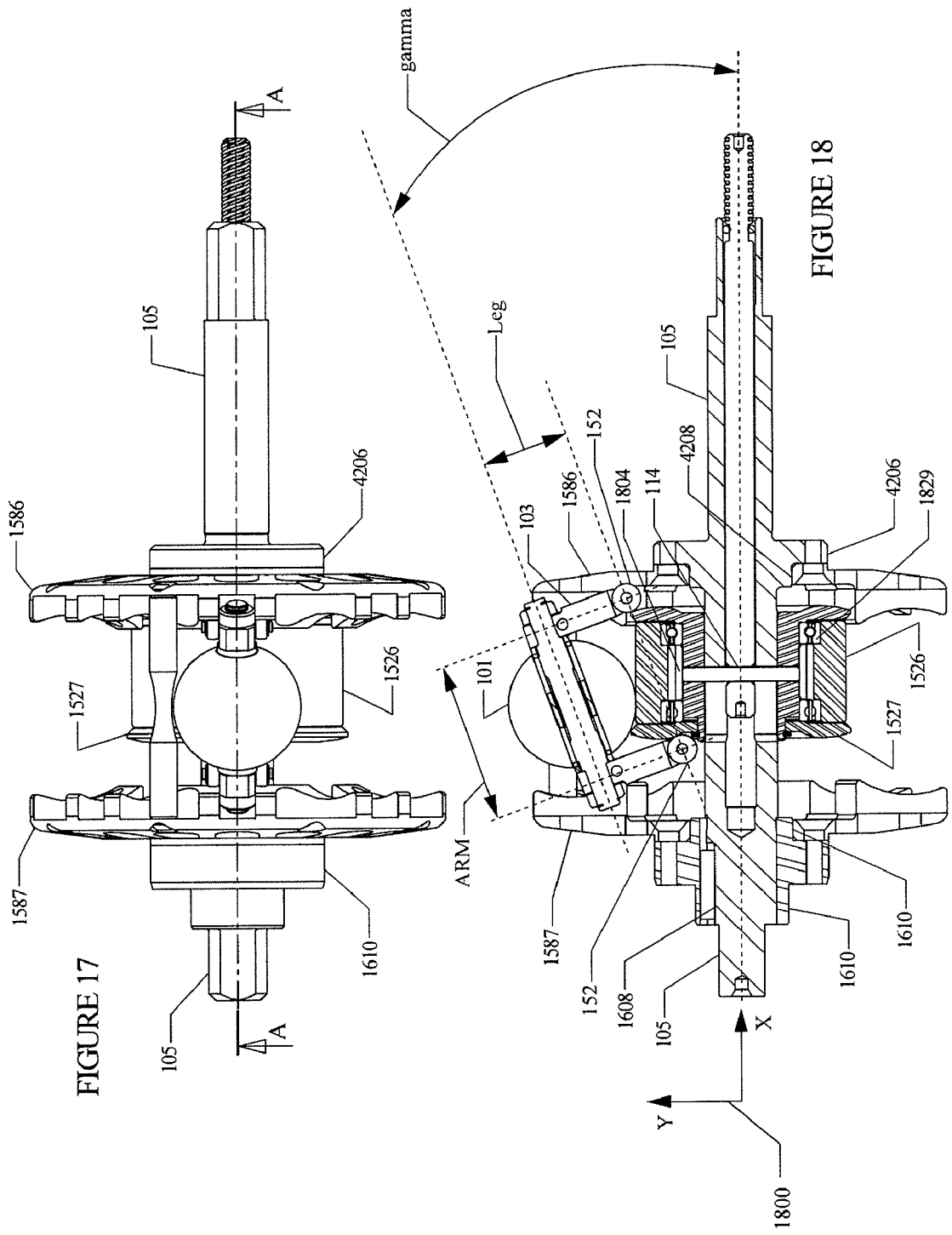

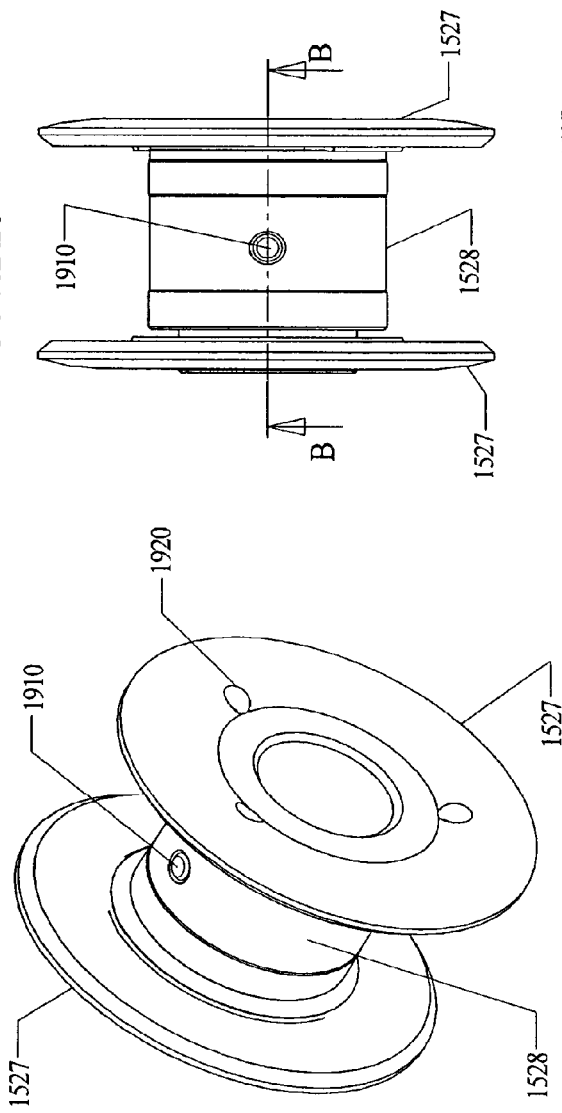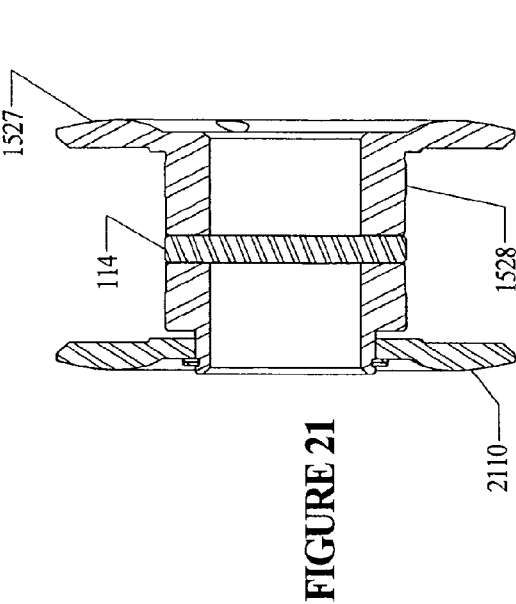

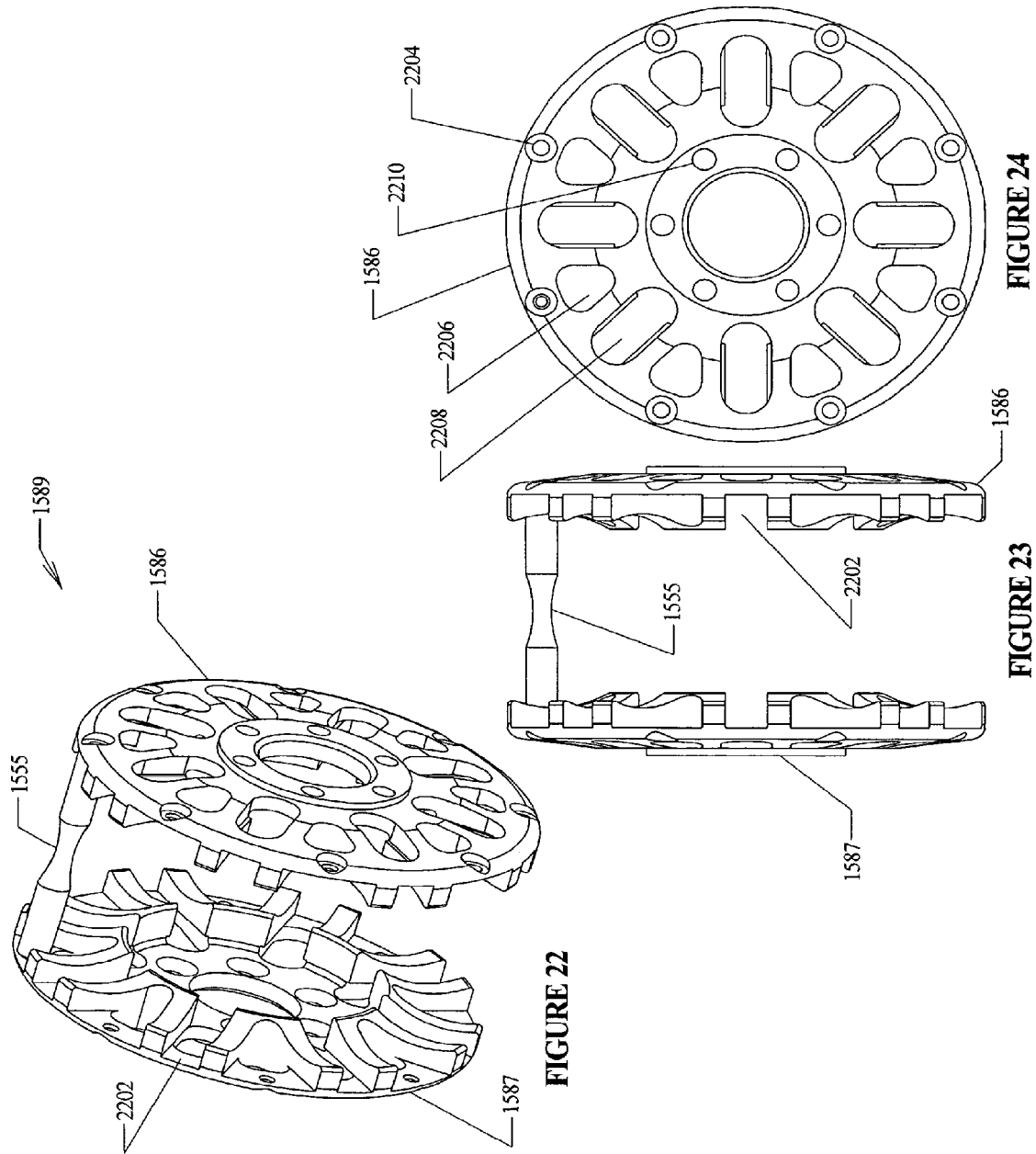

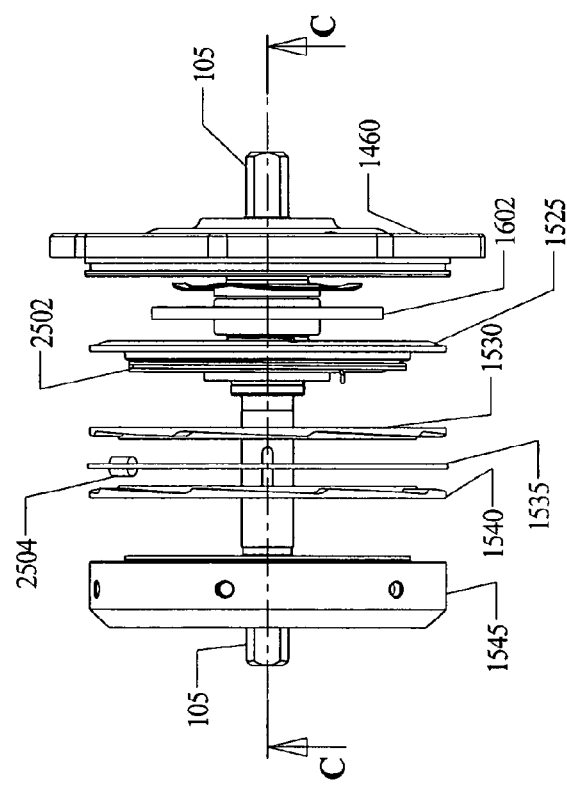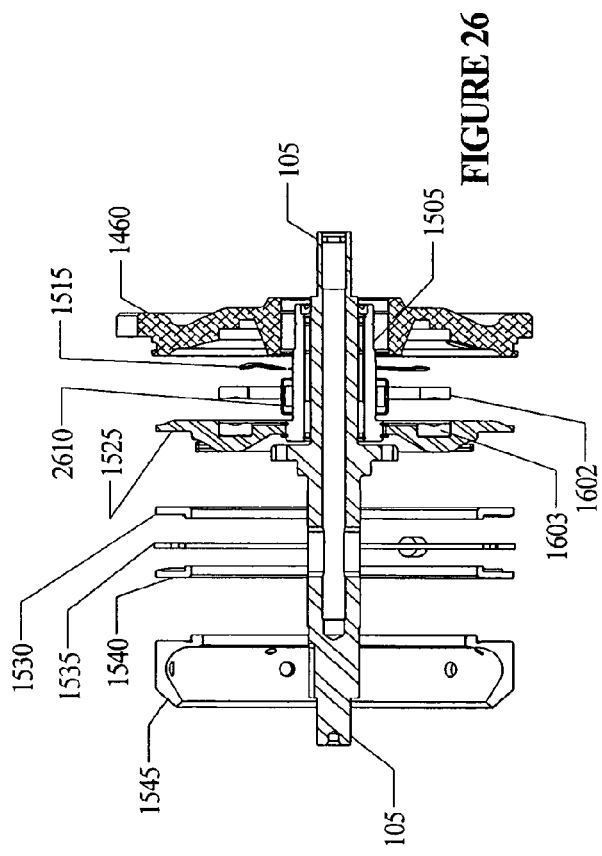

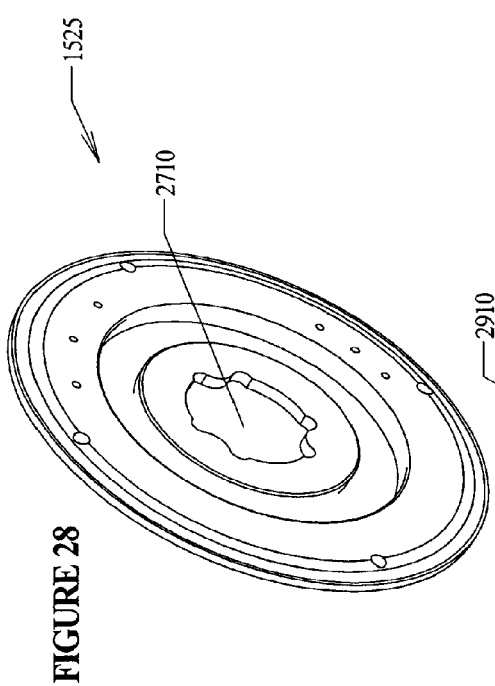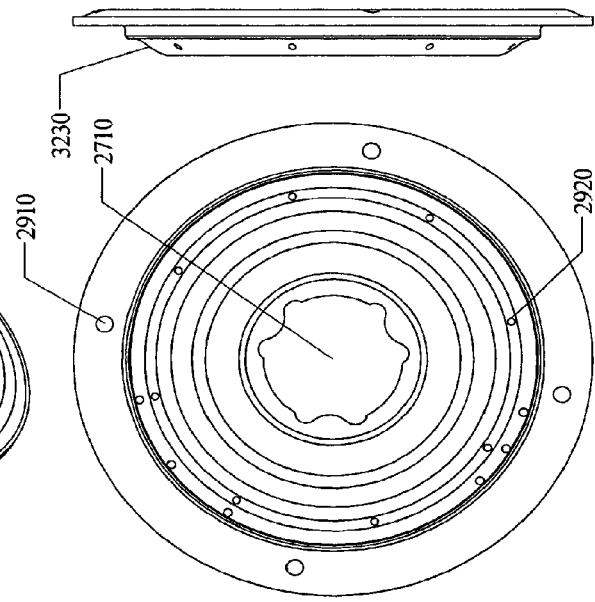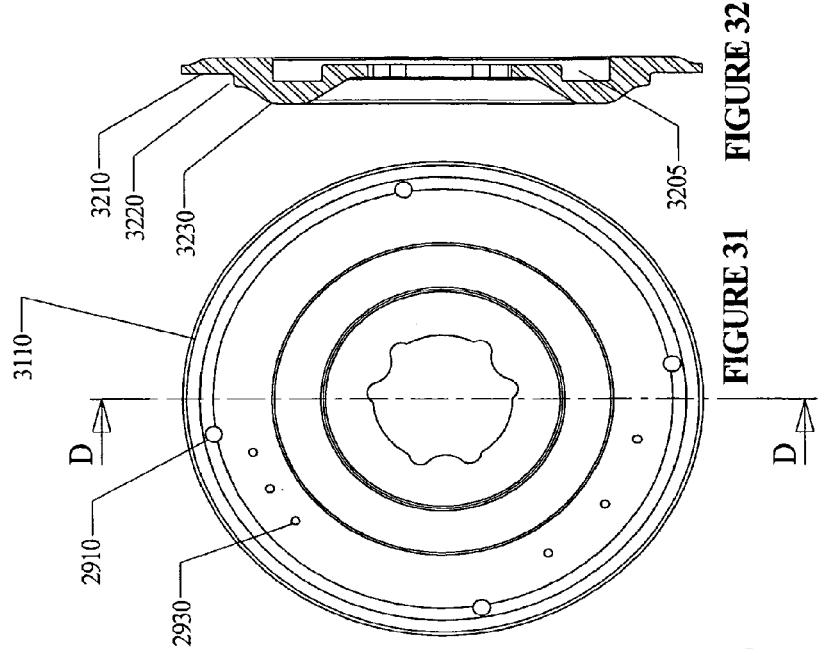

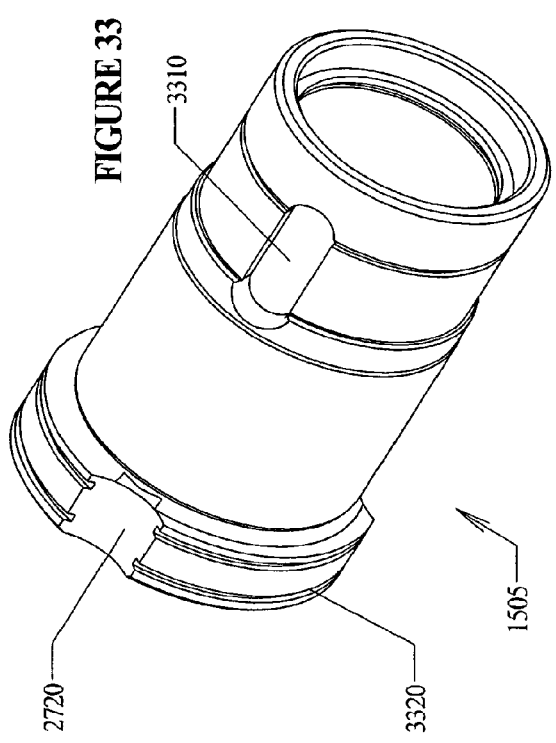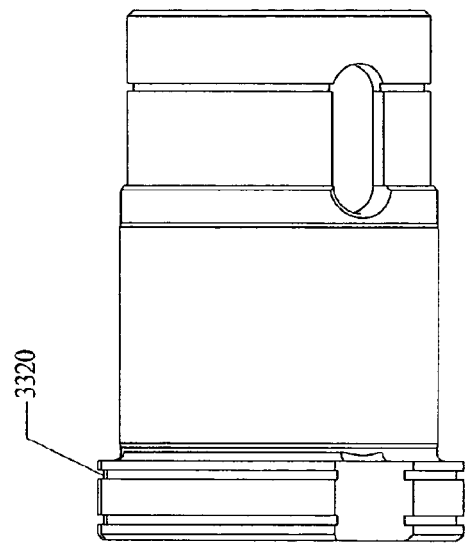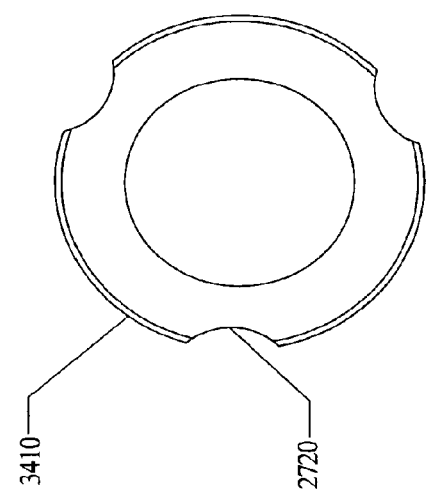

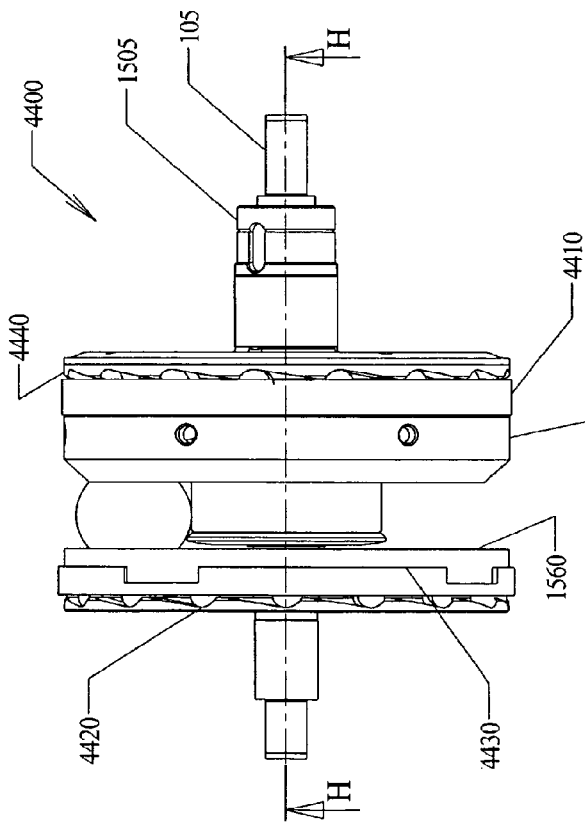

CONTINUOUSLY VARIABLE TRANSMISSION

RELATED APPLICATIONS

This application is a continuation of U.S. application Ser. No. 11/243,484, filed Oct. 4, 2005, which claims the benefit of U.S. Provisional Application No. 60/616,399, filed on Oct. 5, 2004. Each of the above-identified applications is incorporated by reference in its entirety.

BACKGROUND OF THE INVENTION

1. Field of the Invention

The field of the invention relates generally to transmissions, and more particularly to continuously variable transmissions (CVTs).

2. Description of the Related Art

There are well-known ways to achieve continuously variable ratios of input speed to output speed. The mechanism for adjusting an input speed from an output speed in a CVT is known as a variator. In a belt-type CVT, the variator consists of two adjustable pulleys having a belt between them. The variator in a single cavity toroidal-type CVT has two partially toroidal transmission discs rotating about a shaft and two or more disc-shaped power rollers rotating on respective axes that are perpendicular to the shaft and clamped between the input and output transmission discs.

Embodiments of the invention disclosed here are of the spherical-type variator utilizing spherical speed adjusters (also known as power adjusters, balls, sphere gears or rollers) that each has a tiltable axis of rotation; the adjusters are distributed in a plane about a longitudinal axis of a CVT. The rollers are contacted on one side by an input disc and on the other side by an output disc, one or both of which apply a clamping contact force to the rollers for transmission of torque. The input disc applies input torque at an input rotational speed to the rollers. As the rollers rotate about their own axes, the rollers transmit the torque to the output disc. The input speed to output speed ratio is a function of the radii of the contact points of the input and output discs to the axes of the rollers. Tilting the axes of the rollers with respect to the axis of the variator adjusts the speed ratio.

SUMMARY OF INVENTION

One embodiment is a CVT. The CVT includes a central shaft and a variator. The variator includes an input disc, an output disc, a plurality of tiltable ball-leg assemblies, and an idler assembly. The input disc is rotatably mounted about the central shaft. Each of the plurality of tiltable ball-leg assemblies includes a ball, an axle, and at least two legs. The ball is rotatably mounted to the axle and contacts the input disk and the output disk. The legs are configured to control the tilt of the ball. The idler assembly is configured to control the radial position of the legs so as to thereby control the tilt of the ball. In one embodiment, the CVT is adapted for use in a bicycle.

In one embodiment, the variator includes a disk having a splined bore and a driver with splines. The splines of the driver couple to the splined bore of the disk.

In one embodiment, a shift rod extends through the central shaft and connects to the idler assembly. The shift rod actuates the idler assembly.

In one embodiment, a cam loader is positioned adjacent to the input disc and is configured to at least partly generate axial force and transfer torque. In one embodiment, a cam loader is positioned adjacent to the output disc and is configured to at least partly generate axial force and transmit torque. In yet other embodiments, cam loaders are positioned adjacent to both the input disc and the output disc; the cam loaders are configured to at least partly generate axial force and transmit torque.

Another embodiment is a spacer for supporting and separating a cage of a CVT having a hub shell that at least partially encloses a variator. The spacer includes a scraper configured to scrape lubricant from a surface of the hub shell and direct the lubricant toward the inside of the variator. In one embodiment, the spacer includes passages configured to direct the flow of lubricant.

Another aspect of the invention relates to a torsion disc for a CVT. The torsion disc includes a spline bore about its central axis, an annular recess formed in the disc for receiving the race of a bearing, and a raised surface for supporting a torsion spring.

Yet another feature of the invention concerns a shaft for supporting certain components of a CVT. In some embodiments, the shaft has a splined flange, a central bore spanning from one end of the shaft to a point beyond the middle of the shaft, and one or more flanges for attaching to various components of the CVT. In one embodiment, flanges on the shaft are adapted to couple to stators of the CVT.

A different aspect of the inventive CVTs relates to an axial force generating system having a torsion spring coupled to a torsion disc and an input disc of the CVT. The axial force generating system may also include one or more load cam discs having ramps for energizing rollers, which are preferably located between the load cam disc and the input disc and/or output disc of the CVT.

Another feature of the invention is directed to an axle and axle-ball combination for a CVT. In some embodiments, the axle includes shoulder portions and a waist portion. The axle is configured to fit in a central bore of a traction roller of the CVT. In some embodiments, the bearing surface between the axle and the ball may be a journal bearing, a bushing, a Babbitt lining, or the axle itself. In other embodiments, the axle and ball utilize retained bearings.

BRIEF DESCRIPTION OF THE DRAWINGS

FIG. 5a is a side view of a splined input disc driver that can be used in a CVT.

FIG. 5b is a front view of the disc driver of FIG. 5a.

FIG. 6a is a side view of a splined input disc that can be used in a CVT.

FIG. 6b is a front view of the splined input disc of FIG. 6a.

FIG. 11 is a perspective view of a ball-leg assembly for use in a CVT.

FIG. 12 is a perspective view of a cage that can be used in a ball-type CVT.

FIG. 17 is a top elevational view of certain assemblies of the CVT of FIG. 15.

FIG. 18 is a cross-sectional view along section A-A of the assemblies of FIG. 17.

FIG. 19 is a perspective view of one embodiment of a shift cam assembly that can be used with the CVT of FIG. 15.

FIG. 20 is a top elevational view of the shift cam assembly of FIG. 19.

FIG. 21 is a cross-sectional view along section B-B of the shift cam assembly of FIG. 20.

FIG. 22 is perspective view of a cage assembly that can be used with the CVT of FIG. 15.

FIG. 23 is a front elevational view of the cage assembly of FIG. 22.

FIG. 24 is a right side elevational view of the cage assembly of FIG. 22.

FIG. 25 is a partially exploded, front elevational view of certain axial force generation components for the CVT of FIG. 15.

FIG. 26 is a cross-sectional view along section C-C of the CVT components shown in FIG. 25.

FIG. 28 is a perspective view of the torsion disc of FIG. 27.

FIG. 29 is a left side elevational view of the torsion disc of FIG. 28.

FIG. 30 is a front elevation view of the torsion disc of FIG. 28.

FIG. 31 is a right side elevational view of the torsion disc of FIG. 28.

FIG. 32 is a cross-sectional view along section D-D of the torsion disc of FIG. 31.

FIG. 33 is a perspective view of the input shaft of FIG. 27.

FIG. 34 is a left side elevational view of the input shaft of FIG. 33.

FIG. 35 is a top side elevational view of the input shaft of FIG. 33.

FIG. 39 is a top elevational view of the bicycle hub of FIG. 14.

FIG. 40 is a cross-sectional view along section F-F of the hub of FIG. 39 showing certain components of the bicycle hub of FIG. 14 and the CVT of FIG. 15.

FIG. 44 is a top elevational view of an alternative embodiment of a CVT that can be used with the bicycle hub of FIG. 14.

FIG. 45 is a cross-sectional view along section H-H of the CVT of FIG. 44.

DETAILED DESCRIPTION OF THE PREFERRED EMBODIMENTS

The CVT embodiments described here are generally of the type disclosed in U.S. Pat. Nos. 6,241,636, 6,419,608 and 6,689,012. The entire disclosure of each of these patents is hereby incorporated herein by reference.

Figure 1:
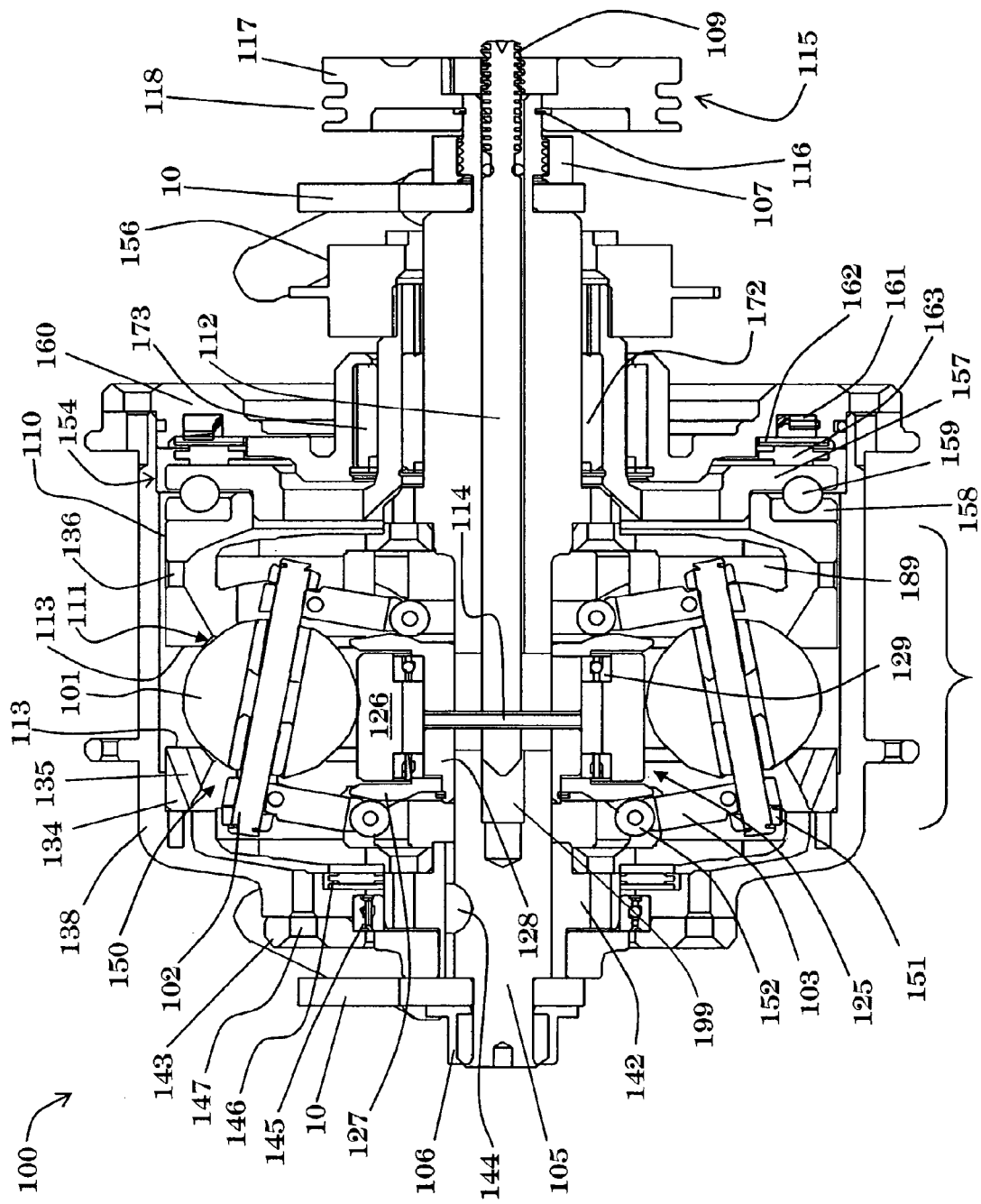
FIG. 1 is a cross-sectional view of one embodiment of a CVT.

FIG. 1 illustrates a spherical-type CVT 100 that can change input to output speed ratios. The CVT 100 has a central shaft 105 extending through the center of the CVT 100 and beyond two rear dropouts 10 of the frame of a bicycle. A first cap nut 106 and second cap nut 107, each located at a corresponding end of the central shaft 105, attach the central shaft 105 to the dropouts. Although this embodiment illustrates the CVT 100 for use on a bicycle, the CVT 100 can be implemented on any equipment that makes use of a transmission. For purposes of description, the central shaft 105 defines a longitudinal axis of the CVT that will serve as a reference point for describing the location and or motion of other components of the CVT. As used here, the terms "axial," "axially," "lateral," "laterally," refer to a position or direction that is coaxial or parallel with the longitudinal axis defined by the central shaft 105. The terms "radial" and "radially" refer to locations or directions that extend perpendicularly from the longitudinal axis.

Figure 2:
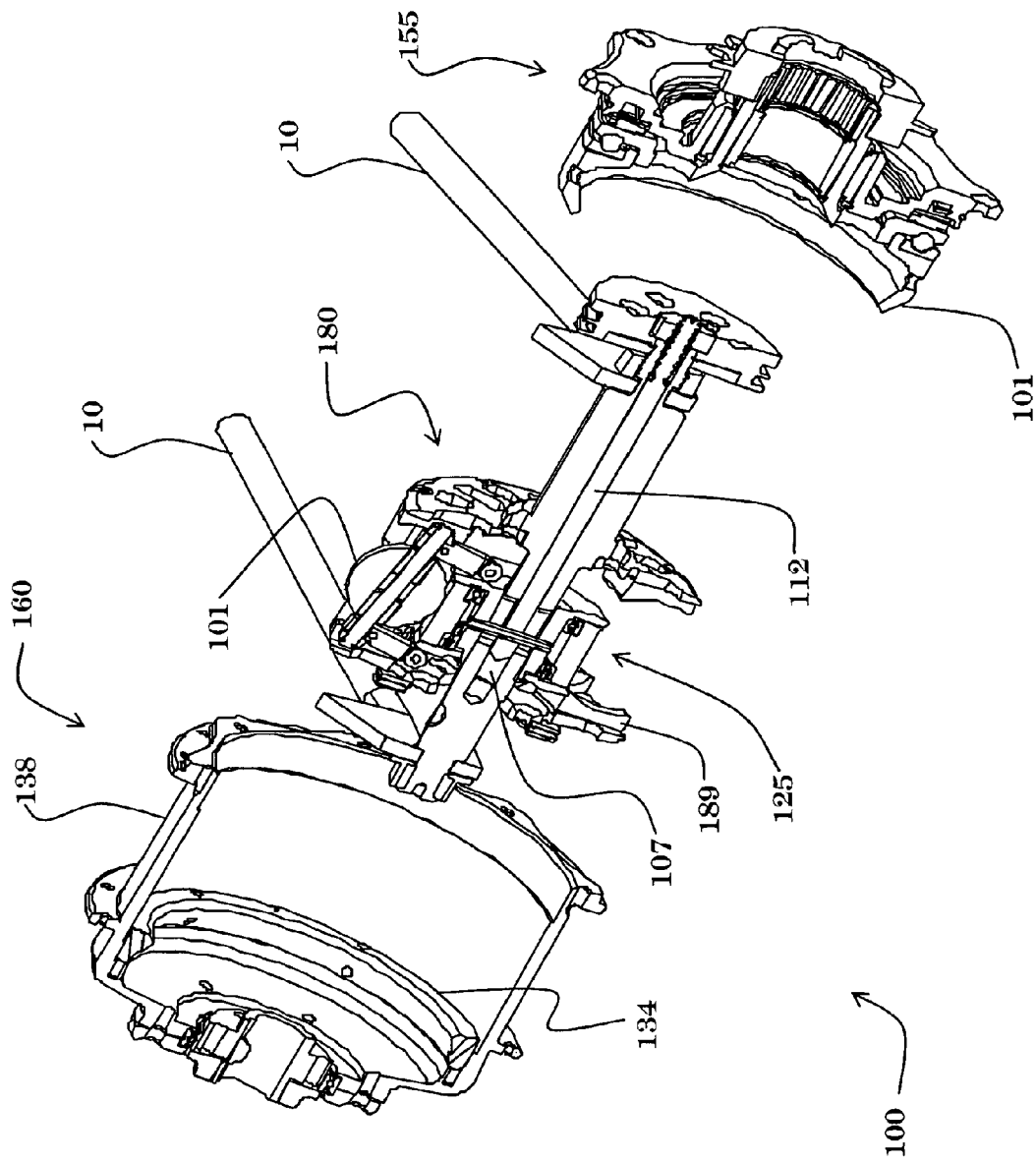
FIG. 2 is a partially exploded cross-sectional view of the CVT of FIG. 1.

Referring to FIGS. 1 and 2, the central shaft 105 provides radial and lateral support for a cage assembly 180, an input assembly 155 and an output assembly 160. In this embodiment the central shaft 105 includes a bore 199 that houses a shift rod 112. As will be described later, the shift rod 112 actuates a speed ratio shift in the CVT 100.

The CVT 100 includes a variator 140. The variator 140 can be any mechanism adapted to change the ratio of input speed to output speed. In one embodiment, the variator 140 includes an input disc 110, an output disc 134, tiltable ball-leg assemblies 150 and an idler assembly 125. The input disc 110 may be a disc mounted rotatably and coaxially about the central shaft 105. At the radial outer edge of the input disc 110, the disc extends at an angle to a point where it terminates at a contact surface 111. In some embodiments, the contact surface 111 can be a separate structure, for example a ring that attaches to the input disc 110, which would provide support for the contact surface 111. The contact surface 111 may be threaded, or press fit, into the input disc 110 or it can be attached with any suitable fasteners or adhesives.

The output disc 134 can be a ring that attaches, by press fit or otherwise, to an output hub shell 138. In some embodiments, the input disc 110 and the output disc 134 have support structures 113 that extend radially outward from contact surfaces 111 and that provide structural support to increase radial rigidity, to resist compliance of those parts under the axial force of the CVT 100, and to allow axial force mechanisms to move radially outward, thereby reducing the length of the CVT 100. The input disc 110 and the output disc 134 can have oil ports 136, 135 to allow lubricant in the variator 140 to circulate through the CVT 100.

The hub shell 138 in some embodiments is a cylindrical tube rotatable about the central shaft 105. The hub shell 138 has an inside that houses most of the components of the CVT 100 and an outside adapted to connect to whatever component, equipment or vehicle uses the CVT. Here the outside of the hub shell 138 is configured to be implemented on a bicycle. However, the CVT 100 can be used in any machine where it is desirable to adjust rotational input and output speeds.

Referring to FIGS. 1, 2, 10 and 11 a CVT may include a ball-leg assembly 150 for transmitting torque from the input disc 110 to the output disc 134 and varying the ratio of input speed to output speed. In some embodiments, the ball-leg assembly 150 includes a ball 101, a ball axle 102, and legs 103. The axle 102 can be a generally cylindrical shaft that extends through a bore formed through the center of the ball 101. In some embodiments, the axle 102 interfaces with the surface of the bore in the ball 101 via needle or radial bearings that align the ball 101 on the axle 102. The axle 102 extends beyond the sides of the ball 101 where the bore ends so that the legs 103 can actuate a shift in the position of the ball 101. Where the axle 102 extends beyond the edge of the ball 101, it couples to the radial outward end of the legs 103. The legs 103 are radial extensions that tilt the ball axle 102.

The axle 102 passes through a bore formed in the radially outward end of a leg 103. In some embodiments, the leg 103 has chamfers where the bore for the axle 102 passes through the legs 103, which provides for reduced stress concentration at the contact between the side of the leg 103 and the axle 102. This reduced stress increases the capacity of the ball-leg assembly 150 to absorb shifting forces and torque reaction. The leg 103 can be positioned on the axle 102 by clip rings, such as e-rings, or can be press fit onto the axle 102; however, any other type of fixation between the axle 102 and the leg 103 can be utilized. The ball-leg assembly 150 can also include leg rollers 151, which are rolling elements attached to each end of a ball axle 102 and provide for rolling contact of the axle 102 as it is aligned by other parts of the CVT 100. In some embodiments, the leg 103 has a cam wheel 152 at a radially inward end to help control the radial position of the leg 103, which controls the tilt angle of the axle 102. In yet other embodiments, the leg 103 couples to a stator wheel 1105 (see FIG. 11) that allows the leg 103 to be guided and supported in the stators 800 (see FIG. 8). As shown in FIG. 11, the stator wheel 1105 may be angled relative to the longitudinal axis of the leg 103. In some embodiments, the stator wheel 1105 is configured such that its central axis intersects with the center of the ball 101.

Still referring to FIGS. 1, 2, 10 and 11, in various embodiments the interface between the balls 101 and the axles 102 can be any of the bearings described in other embodiments below. However, the balls 101 are fixed to the axles in other embodiments and rotate with the balls 101. In some such embodiments, bearings (not shown) are positioned between the axles 102 and the legs 103 such that the transverse forces acting on the axles 102 are reacted by the legs 103 as well as, or alternatively, the cage (described in various embodiments below). In some such embodiments, the bearing positioned between the axles 102 and the legs 103 are radial bearings (balls or needles), journal bearings or any other type of bearings or suitable mechanism or means.

With reference to FIGS. 1, 2, 3, 4 and 10, the idler assembly 125 will now be described. In some embodiments, the idler assembly 125 includes an idler 126, cam discs 127, and idler bearings 129. The idler 126 is a generally cylindrical tube. The idler 126 has a generally constant outer diameter; however, in other embodiments the outer diameter is not constant. The outer diameter may be smaller at the center portion than at the ends, or may be larger at the center and smaller at the ends. In other embodiments, the outer diameter is larger at one end than at the other and the change between the two ends may be linear or non-linear depending on shift speed and torque requirements.

The cam discs 127 are positioned on either or both ends of the idler 126 and interact with the cam wheels 152 to actuate the legs 103. The cam discs 127 are convex in the illustrated embodiment, but can be of any shape that produces a desired motion of the legs 103. In some embodiments, the cam discs 127 are configured such that their axial position controls the radial position of the legs 103, which governs the angle of tilt of the axles 102.

In some embodiments, the radial inner diameter of the cam discs 127 extends axially toward one another to attach one cam disc 127 to the other cam disc 127. Here, a cam extension 128 forms a cylinder about the central shaft 105. The cam extension 128 extends from one cam disc 127 to the other cam disc 127 and is held in place there by a clip ring, a nut, or some other suitable fastener. In some embodiments, one or both of the cam discs 127 are threaded onto the cam disc extension 128 to fix them in place. In the illustrated embodiment, the convex curve of the cam disc 127 extends axially away from the axial center of the idler assembly 125 to a local maximum, then radially outward, and back axially inward toward the axial center of the idler assembly 125. This cam profile reduces binding that can occur during shifting of the idler assembly 125 at the axial extremes. Other cam shapes can be used as well.

In the embodiment of FIG. 1, a shift rod 112 actuates a transmission ratio shift of the CVT 100. The shift rod 112, coaxially located inside the bore 199 of the central shaft 105, is an elongated rod having a threaded end 109 that extends out one side of the central shaft 105 and beyond the cap nut 107. The other end of the shift rod 112 extends into the idler assembly 125 where it contains a shift pin 114, which mounts generally transversely in the shift rod 112. The shift pin 114 engages the idler assembly 125 so that the shift rod 112 can control the axial position of the idler assembly 125. A lead screw assembly 115 controls the axial position of the shift rod 112 within the central shaft 105. In some embodiments, the lead screw assembly 125 includes a shift actuator 117, which may be a pulley having a set of tether threads 118 on its outer diameter with threads on a portion of its inner diameter to engage the shift rod 112. The lead screw assembly 115 may be held in its axial position on the central shaft 105 by any means, and here is held in place by a pulley snap ring 116. The tether threads 118 engage a shift tether (not shown). In some embodiments, the shift tether is a standard shift cable, while in other embodiments the shift tether can be any tether capable of supporting tension and thereby rotating the shift pulley 117.

Referring to FIGS. 1 and 2, the input assembly 155 allows torque transfer into the variator 140. The input assembly 155 has a sprocket 156 that converts linear motion from a chain (not shown) into rotational motion. Although a sprocket is used here, other embodiments of the CVT 100 may use a pulley that accepts motion from a belt, for example. The sprocket 156 transmits torque to an axial force generating mechanism, which in the illustrated embodiment is a cam loader 154 that transmits the torque to the input disc 110. The cam loader 154 includes a cam disc 157, a load disc 158 and a set of cam rollers 159. The cam loader 154 transmits torque from the sprocket 156 to the input disc 110 and also generates an axial force that resolves into the contact force for the input disc 110, the balls 101, the idler 126 and the output disc 134. The axial force is generally proportional to the amount of torque applied to the cam loader 154. In some embodiments, the sprocket 156 applies torque to the cam disc 157 via a one-way clutch (detail not shown) that acts as a coasting mechanism when the hub 138 spins but the sprocket 156 is not supplying torque. In some embodiments, the load disc 158 may be integral as a single piece with the input disc 157. In other embodiments, the cam loader 154 may be integral with the output disc 134.

In FIGS. 1 and 2, the internal components of the CVT 100 are contained within the hub shell 138 by an end cap 160. The end cap 160 is a generally flat disc that attaches to the open end of the hub shell 138 and has a bore through the center to allow passage of the cam disc 157, the central shaft 105 and the shift rod 112. The end cap 160 attaches to the hub shell 138 and serves to react the axial force created by the cam loader 154. The end cap 160 can be made of any material capable of reacting the axial force such as for example, aluminum, titanium, steel, or high strength thermoplastics or thermoset plastics. The end cap 160 fastens to the hub shell 138 by fasteners (not shown); however, the end cap 160 can also thread into, or can otherwise be attached to, the hub shell 138. The end cap 160 has a groove formed about a radius on its side facing the cam loader 154 that houses a preloader 161. The preloader 161 can be a spring that provides and an initial clamp force at very low torque levels. The preloader 161 can be any device capable of supplying an initial force to the cam loader 154, and thereby to the input disc 134, such as a spring, or a resilient material like an o-ring. The preloader 161 can be a wave-spring as such springs can have high spring constants and maintain a high level of resiliency over their lifetimes. Here the preloader 161 is loaded by a thrust washer 162 and a thrust bearing 163 directly to the end cap 160. In this embodiment, the thrust washer 162 is a typical ring washer that covers the groove of the preloader 161 and provides a thrust race for the thrust bearing 163. The thrust bearing 163 may be a needle thrust bearing that has a high level of thrust capacity, improves structural rigidity, and reduces tolerance requirements and cost when compared to combination thrust radial bearings; however, any other type of thrust bearing or combination bearing can be used. In certain embodiments, the thrust bearing 163 is a ball thrust bearing. The axial force developed by the cam loader 154 is reacted through the thrust bearing 163 and the thrust washer 162 to the end cap 160. The end cap 160 attaches to the hub shell 138 to complete the structure of the CVT 100.

In FIGS. 1 and 2, a cam disc bearing 172 holds the cam disc 157 in radial position with respect to the central shaft 105, while an end cap bearing 173 maintains the radial alignment between the cam disc 157 and the inner diameter of the end cap 160. Here the cam disc bearing 172 and the end cap bearing 173 are needle roller bearings; however, other types of radial bearings can be used as well. The use of needle roller bearings allow increased axial float and accommodates binding moments developed by the rider and the sprocket 156. In other embodiments of the CVT 100 or any other embodiment described herein, each of or either of the can disc bearing 172 and the end cap bearing 173 can also be replaced by a complimentary pair of combination radial-thrust bearings. In such embodiments, the radial thrust bearings provide not only the radial support but also are capable of absorbing thrust, which can aid and at least partially unload the thrust bearing 163.

Still referring to FIGS. 1 and 2, an axle 142, being a support member mounted coaxially about the central shaft 105 and held between the central shaft 105 and the inner diameter of the closed end of the hub shell 138, holds the hub shell 138 in radial alignment with respect to the central shaft 105. The axle 142 is fixed in its angular alignment with the central shaft 105. Here a key 144 fixes the axle 142 in its angular alignment, but the fixation can be by any means known to those of skill in the relevant technology. A radial hub bearing 145 fits between the axle 142 and the inner diameter of the hub shell 138 to maintain the radial position and axial alignment of the hub shell 138. The hub bearing 145 is held in place by an encapsulating axle cap 143. The axle cap 143 is a disc having a central bore that fits around central shaft 105 and here attaches to the hub shell 138 with fasteners 147. A hub thrust bearing 146 fits between the hub shell 138 and the cage 189 to maintain the axial positioning of the cage 189 and the hub shell 138.

Figure 3:
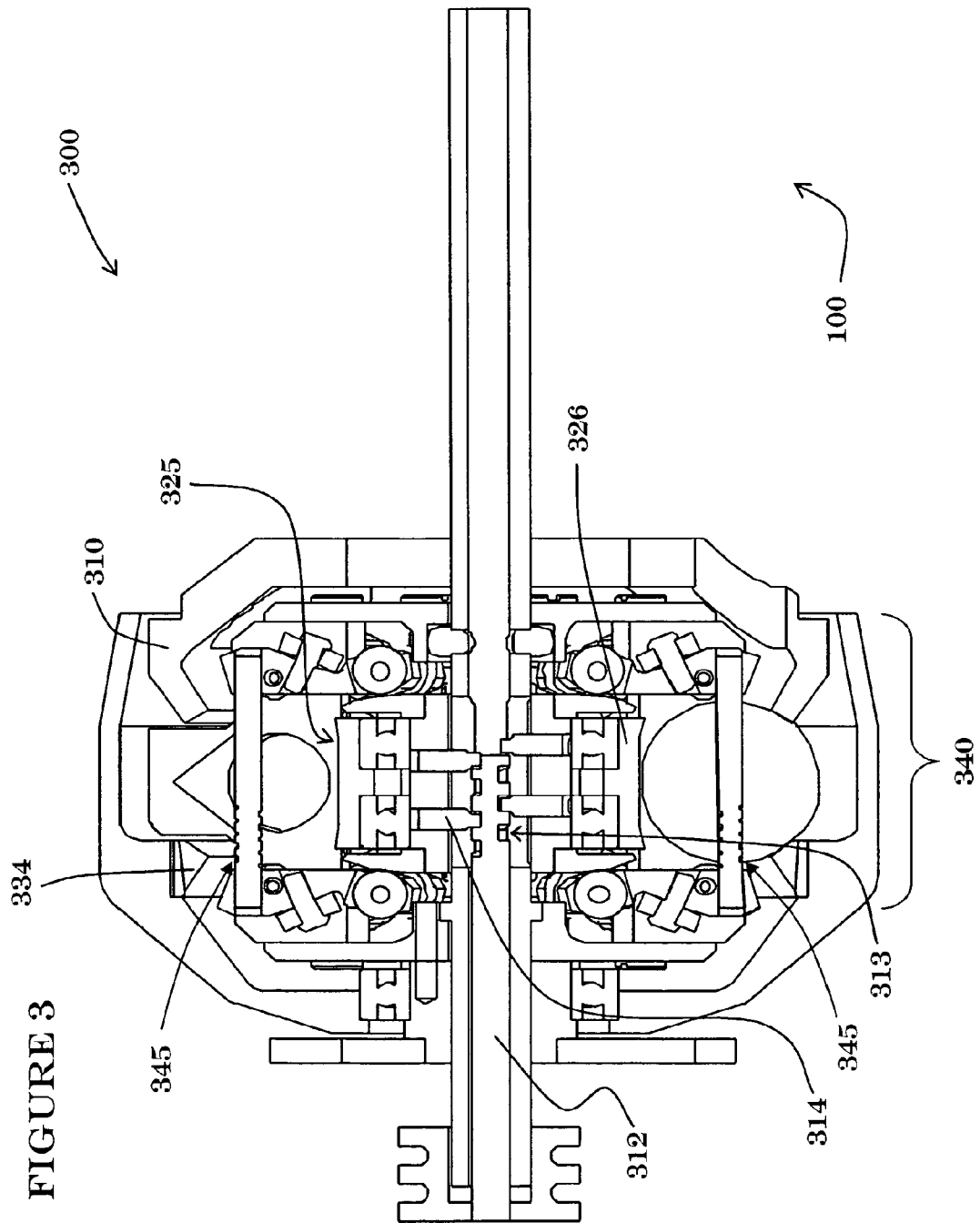
FIG. 3 is a cross-sectional view of a second embodiment of a CVT.
Figure 4:
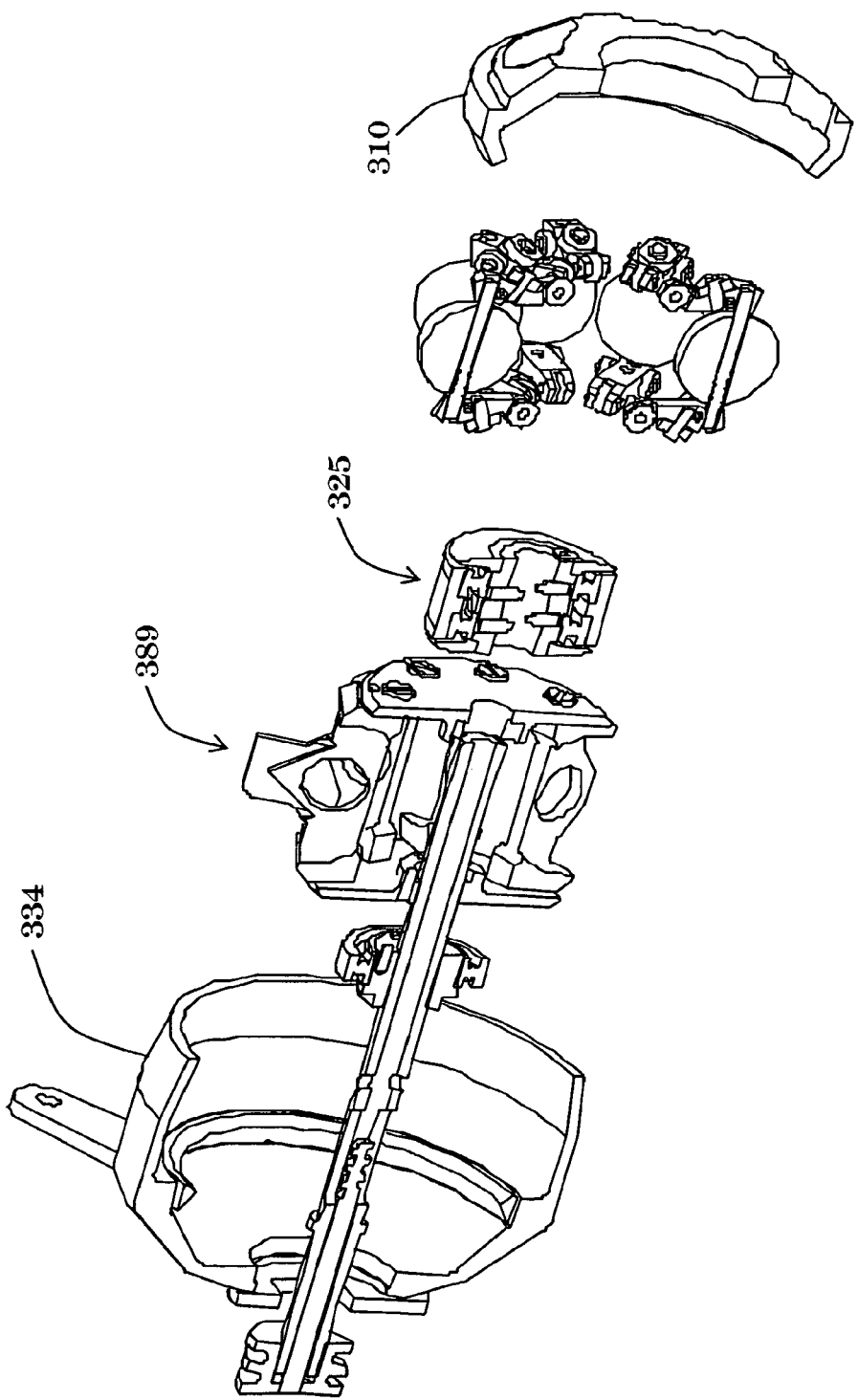
FIG. 4 is a partially exploded cross-sectional view of the CVT of FIG. 3.
Figure 10:
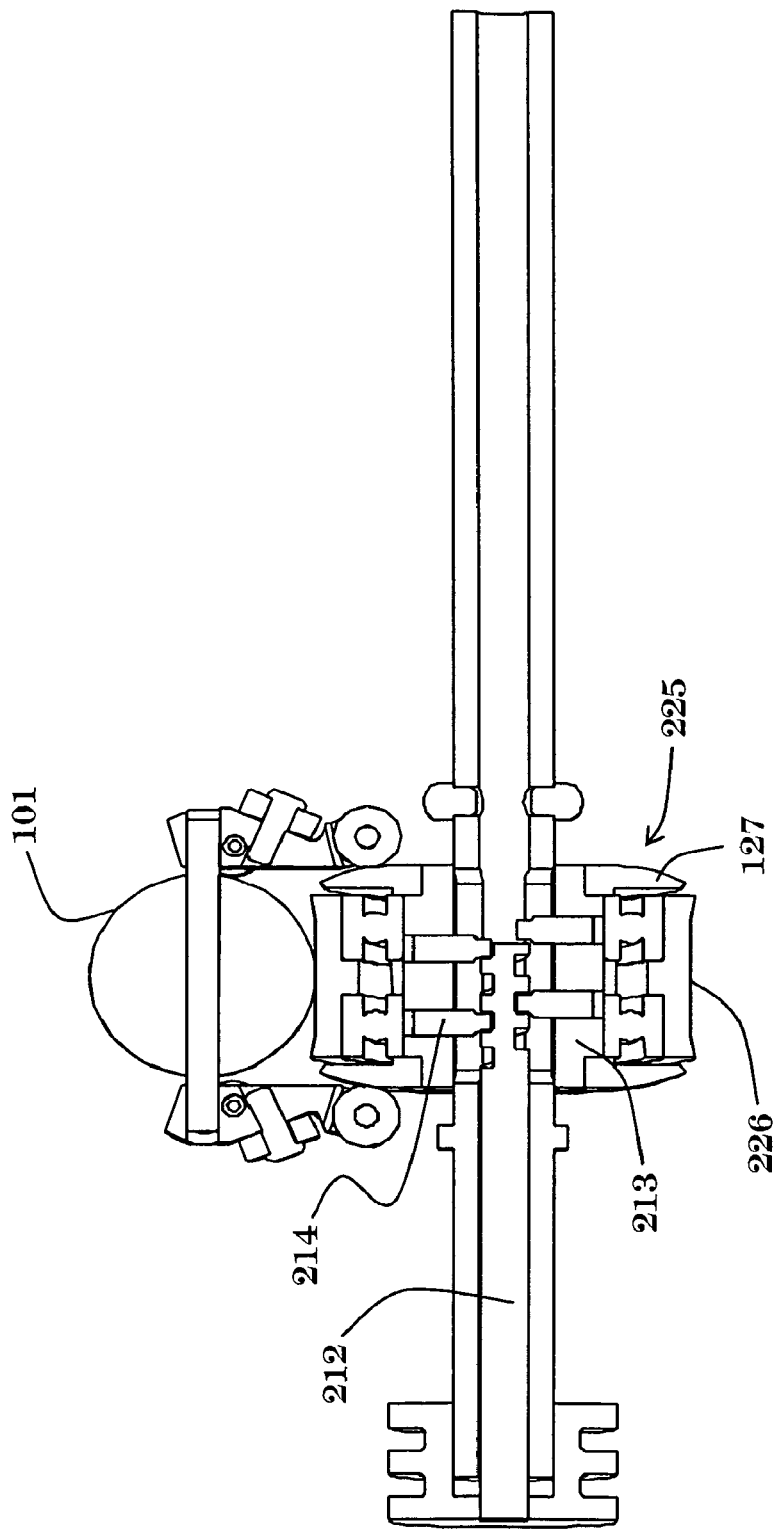
FIG. 10 is a cross-sectional view of a shifter assembly that can be used in a CVT.

FIGS. 3, 4 and 10 illustrate a CVT 300, which is an alternative embodiment of the CVT 100 described above. Many of the components are similar between the CVT 100 embodiments described above and that of the present figures. Here, the angles of the input and output discs 310, 334 respectively are decreased to allow for greater strength to withstand axial forces and to reduce the overall radial diameter of the CVT 300. This embodiment shows an alternate shifting mechanism, where the lead screw mechanism to actuate axial movement of the idler assembly 325 is formed on the shift rod 312. The lead screw assembly is a set of lead threads 313 formed on the end of the shift rod 312 that is within or near the idler assembly 325. One or more idler assembly pins 314 extend radially from the cam disc extensions 328 into the lead threads 313 and move axially as the shift rod 312 rotates.

In the illustrated embodiment, the idler 326 does not have a constant outer diameter, but rather has an outer diameter that increases at the ends of the idler 326. This allows the idler 326 to resist forces of the idler 326 that are developed through the dynamic contact forces and spinning contact that tend to drive the idler 326 axially away from a center position. However, this is merely an example and the outer diameter of the idler 326 can be varied in any manner a designer desires in order to react the spin forces felt by the idler 326 and to aid in shifting of the CVT 300.

Referring now to FIGS. 5a, 5b, 6a, and 6b, a two part disc is made up of a splined disc 600 and a disc driver 500. The disc driver 500 and the splined disc 600 fit together through splines 510 formed on the disc driver 500 and a splined bore 610 formed in the splined disc 600. The splines 510 fit within the splined bore 610 so that the disc driver 500 and the splined disc 600 form a disc for use in the CVT 100, CVT 300, or any other spherical CVT. The splined disc 600 provides for compliance in the system to allow the variator 140, 340 to find a radial equilibrium position so as to reduce sensitivity to manufacturing tolerances of the components of a variator 140, 340.

Figure 7:
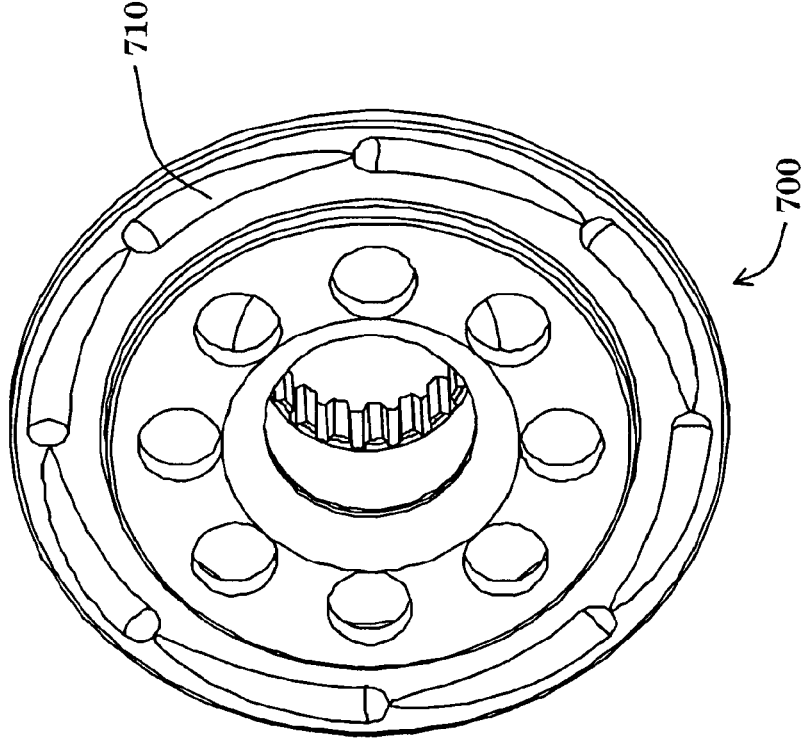
FIG. 7 is a cam roller disc that can be used with a CVT.

FIG. 7 illustrates a cam disc 700 that can be used in the CVT 100, CVT 300, other spherical CVTs or any other type of CVT. The cam disc 700 has cam channels 710 formed in its radial outer edge. The cam channels 710 house a set of cam rollers (not shown) which in this embodiment are spheres (such as bearing balls) but can be any other shape that combines with the shape of the cam channel 710 to convert torque into torque and axial force components to moderate the axial force applied to the variator 140, 340 in an amount proportional to the torque applied to the CVT. Other such shapes include cylindrical rollers, barreled rollers, asymmetrical rollers or any other shape. The material used for the cam disc channels 710 in many embodiments is preferably strong enough to resist excessive or permanent deformation at the loads that the cam disc 700 will experience. Special hardening may be needed in high torque applications. In some embodiments, the cam disc channels 710 are made of carbon steel hardened to Rockwell hardness values above 40 HRC. The efficiency of the operation of the cam loader (154 of FIG. 1, or any other type of cam loader) can be affected by the hardness value, typically by increasing the hardness to increase the efficiency; however, high hardening can lead to brittleness in the cam loading components and can incur higher cost as well. In some embodiments, the hardness is above 50 HRC, while in other embodiments the hardness is above 55 HRC, above 60 HRC and above 65 HRC.

FIG. 7 shows an embodiment of a conformal cam. That is, the shape of the cam channel 710 conforms to the shape of the cam rollers. Since the channel 710 conforms to the roller, the channel 710 functions as a bearing roller retainer and the requirement of a cage element is removed. The embodiment of FIG. 7 is a single direction cam disc 700; however, the cam disc can be a bidirectional cam as in the CVT 1300 (see FIG. 13). Eliminating the need for a bearing roller retainer simplifies the design of the CVT. A conformal cam channel 710 also allows the contact stress between the bearing roller and the channel 710 to be reduced, allowing for reduced bearing roller size and/or count, or for greater material choice flexibility.

Figure 8:
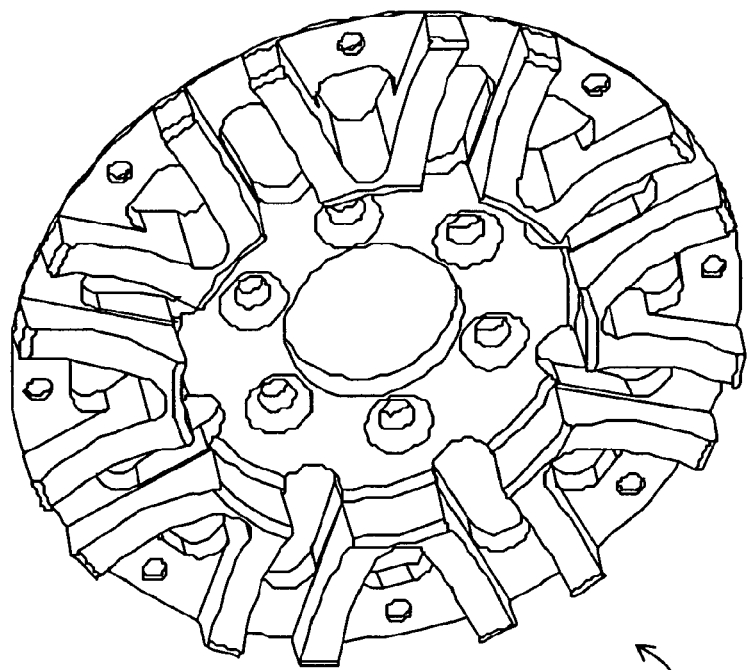
FIG. 8 is a stator that can be used with a CVT.

FIG. 8 illustrates a cage disc 800 used to form the rigid support structure of the cage 189 of the variators 140, 340 in spherical CVTs 100, 300 (and other types). The cage disc 800 is shaped to guide the legs 103 as they move radially inward and outward during shifting. The cage disc 800 also provides the angular alignment of the axles 102. In some embodiments the corresponding grooves of two cage discs 800 for a respective axle 102 are offset slightly in the angular direction to reduce shift forces in the variators 140 and 340.

Legs 103 are guided by slots in the stators. Leg rollers 151 on the legs 103 follow a circular profile in the stators. The leg rollers 151 generally provide a translational reaction point to counteract translational forces imposed by shift forces or traction contact spin forces. The legs 103 as well as its respective leg rollers 151 move in planar motion when the CVT ratio is changed and thus trace out a circular envelope which is centered about the ball 101. Since the leg rollers 151 are offset from the center of the leg 103, the leg rollers 151 trace out an envelope that is similarly offset. To create a compatible profile on each stator to match the planar motion of the leg rollers 151, a circular cut is required that is offset from the groove center by the same amount that the roller is offset in each leg 103. This circular cut can be done with a rotary saw cutter; however, it requires an individual cut at each groove. Since the cuts are independent, there is a probability of tolerance variation from one groove to the next in a single stator, in addition to variation between stators. A method to eliminate this extra machining step is to provide a single profile that can be generated by a lath turning operation. A toroidal-shaped lathe cut can produce this single profile in one turning operation. The center of the toroidal cut is adjusted away from the center of the ball 101 position in a radial direction to compensate for offset of the leg rollers 103.

Figure 9:
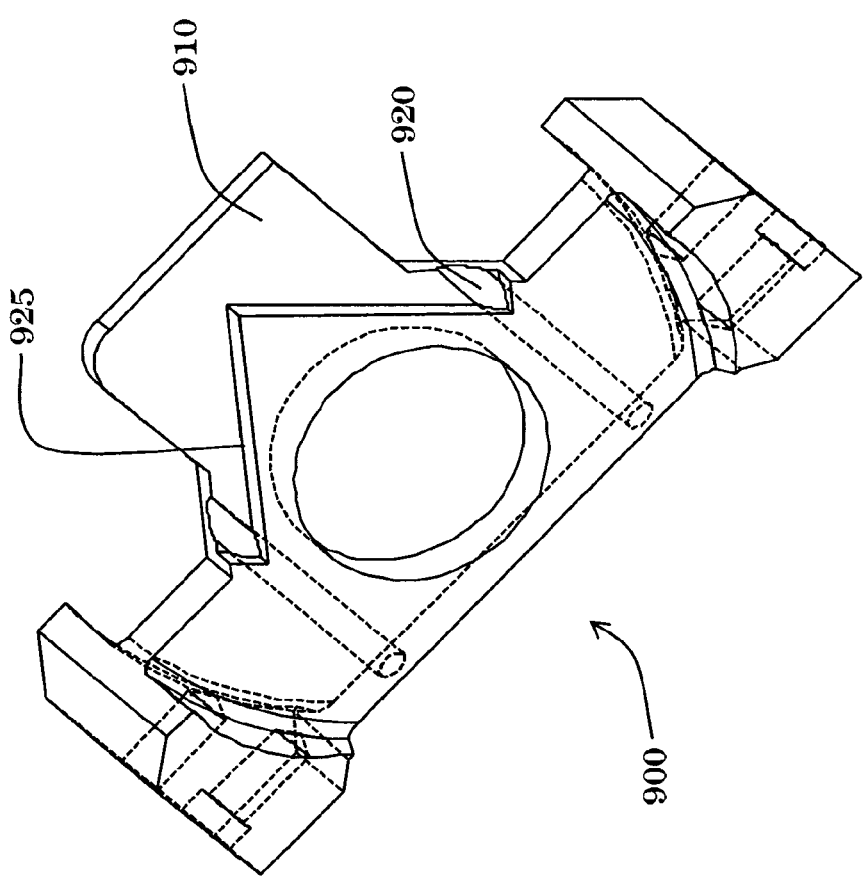
FIG. 9 is a perspective view of a scraping spacer that can be used with a CVT.

Referring now to FIGS. 1, 9 and 12, an alternative embodiment of a cage assembly 1200 is illustrated implementing a lubrication enhancing lubricating spacer 900 for use with some CVTs where spacers 1210 support and space apart two cage discs 1220. In the illustrated embodiment, the support structure for the power transmission elements, in this case the cage 389, is formed by attaching input and output side cage discs 1220 to a plurality of spacers 1210, including one or more lubricating spacers 900 with cage fasteners 1230. In this embodiment, the cage fasteners 1230 are screws but they can be any type of fastener or fastening method. The lubricating spacer 900 has a scraper 910 for scraping lubricant from the surface of the hub shell 138 and directing that lubricant back toward the center elements of the variator 140 or 340. The lubricating spacer 900 of some embodiments also has passages 920 to help direct the flow of lubricant to the areas that most utilize it. In some embodiments, a portion of the spacer 900 between the passages 920 forms a raised wedge 925 that directs the flow of lubricant towards the passages 920. The scraper 910 may be integral with the spacer 900 or may be separate and made of a material different from the material of the scraper 910, including but not limited to rubber to enhance scraping of lubricant from the hub shell 138. The ends of the spacers 1210 and the lubricating spacers 900 terminate in flange-like bases 1240 that extend perpendicularly to form a surface for mating with the cage discs 1220. The bases 1240 of the illustrated embodiment are generally flat on the side facing the cage discs 1240 but are rounded on the side facing the balls 101 so as to form the curved surface described above that the leg rollers 151 ride on. The bases 1240 also form the channel in which the legs 103 ride throughout their travel.

An embodiment of a lubrication system and method will now be described with reference to FIGS. 3, 9, and 10. As the balls 101 spin, lubricant tends to flow toward the equators of the balls 101, and the lubricant is then sprayed out against the hub shell 138. Some lubricant does not fall on the internal wall of the hub shell 138 having the largest diameter; however, centrifugal force makes this lubricant flow toward the largest inside diameter of the hub shell 138. The scraper 910 is positioned vertically so that it removes lubricant that accumulates on the inside of the hub shell 138. Gravity pulls the lubricant down each side of V-shaped wedge 925 and into the passages 920. The spacer 900 is placed such that the inner radial end of the passages 920 end in the vicinity of the cam discs 127 and the idler 126. In this manner the idler 126 and the cam discs 127 receive lubrication circulating in the hub shell 138. In one embodiment, the scraper 910 is sized to clear the hub shell 138 by about 30 thousandths of an inch. Of course, depending on different applications, the clearance could be greater or smaller.

As shown in FIGS. 3 and 10, a cam disc 127 can be configured so that its side facing the idler 226 is angled in order to receive lubricant falling from the passages 920 and direct the lubricant toward the space between the cam disc 127 and the idler 226. After lubricant flows onto the idler 226, the lubricant flows toward the largest diameter of the idler 226, where some of the lubricant is sprayed at the axles 102. Some of the lubricant falls from the passages 920 onto the idler 226. This lubricant lubricates the idler 226 as well as the contact patch between the balls 101 and the idler 226. Due to the inclines on each side of the idler 226, some of the lubricant flows centrifugally out toward the edges of the idler 226, where it then sprays out radially.

Referring to FIGS. 1, 3 and 10, in some embodiments, lubricant sprayed from the idler 126, 226 towards the axle 102 falls on grooves 345, which receive the lubricant and pump it inside the ball 101. Some of the lubricant also falls on the contact surface 111 where the input disc 110 and output disc 134 contact the balls 101. As the lubricant exits on one side of the ball 101, the lubricant flows toward the equator of the balls 101 under centrifugal force. Some of this lubricant contacts the input disc 110 and ball 101 contact surface 111 and then flows toward the equator of the ball 101. Some of the lubricant flows out radially along a side of the output disc 134 facing away from the balls 101. In some embodiments, the input disc 110 and/or output disc 134 are provided with lubrication ports 136 and 135, respectively. The lubrication ports 135, 136 direct the lubrication toward the largest inside diameter of the hub shell 138.

Figure 13:
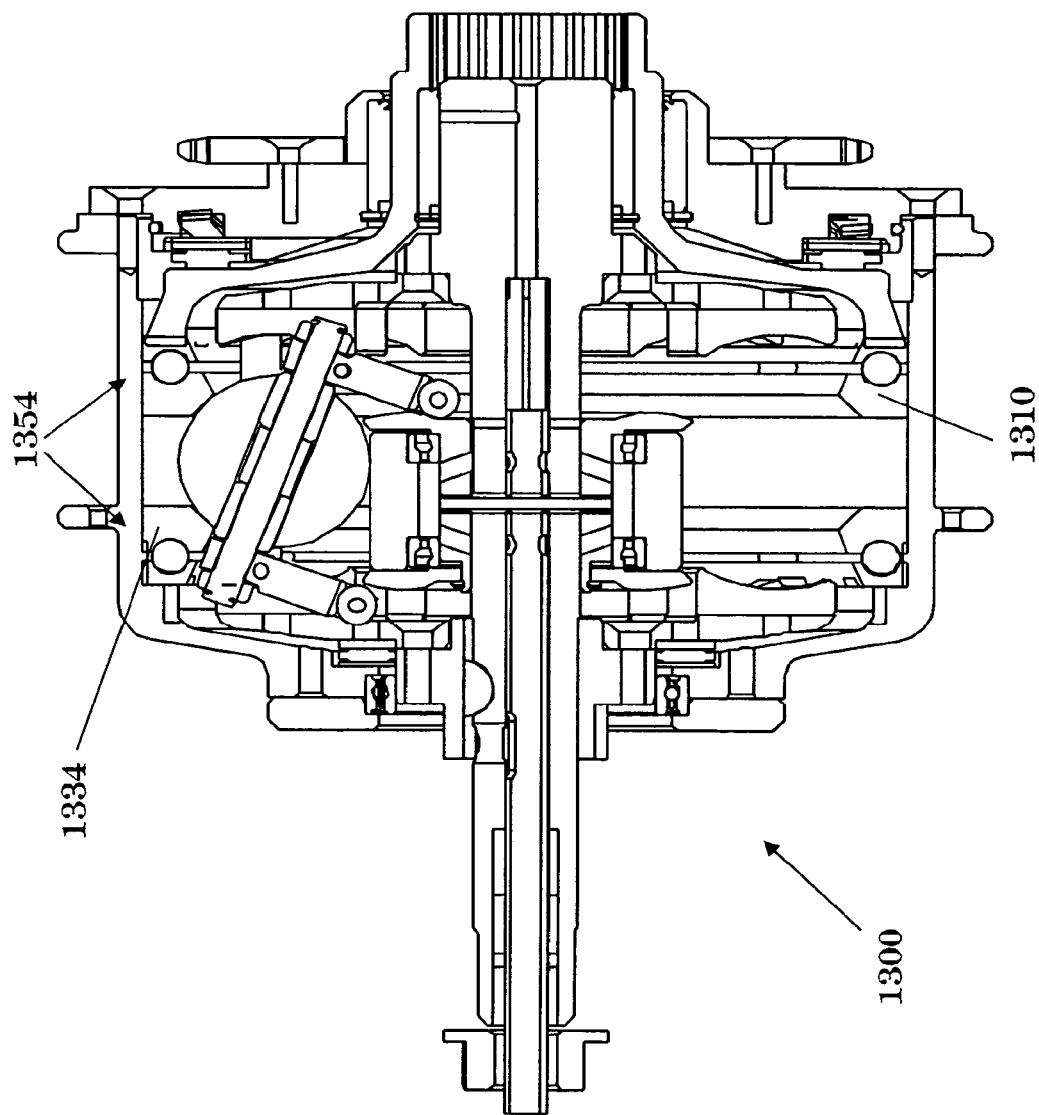
FIG. 13 is a cross-sectional view of another embodiment of a CVT.

FIG. 13 illustrates an embodiment of a CVT 1300 having two cam-loaders 1354 that share the generation and distribution of axial force in the CVT 1300. Here, the cam loaders 1354 are positioned adjacent to the input disc 1310 and the output disc 1334. The CVT 1300 illustrates how torque can be supplied either via the input disc 1310 and out through the output disc 1334 or reversed so that torque is input through the output disc 1334 and output through the input disc 1310.

Figure 14:
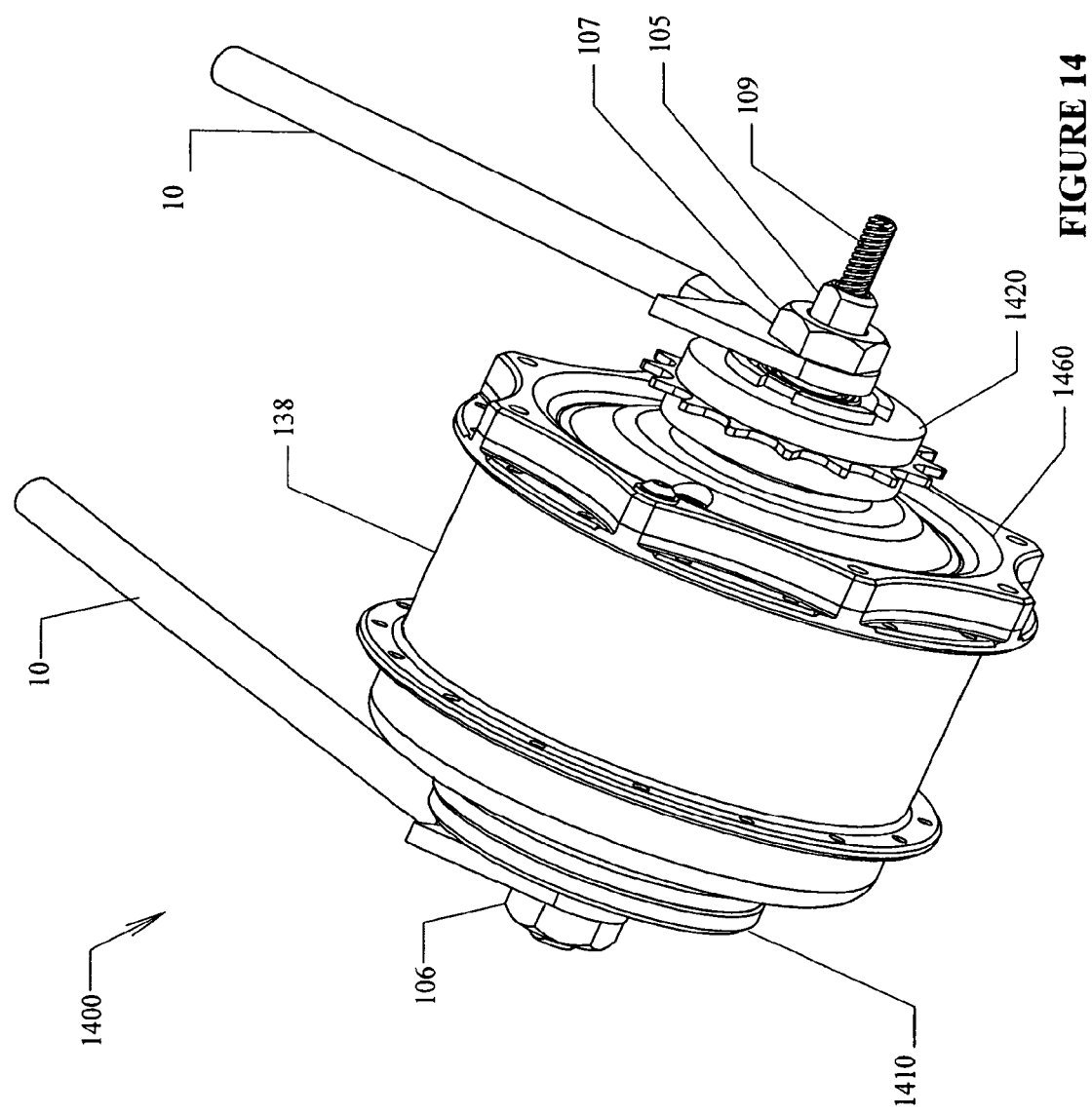
FIG. 14 is a perspective view of a bicycle hub incorporating an embodiment of a CVT.

FIG. 14 depicts a bicycle hub 1400 configured to incorporate inventive features of embodiments of the CVTs described here. Several components of the hub 1400 are the same as components described above; hence, further description of such components will be limited. The hub 1400 includes a hub shell 138 that couples to a hub cap 1460. In some embodiments, the hub 1400 also includes an end cap 1410 that seals the end of the hub shell 138 opposite the hub cap 1460. The hub shell 138, the hub cap 1460, and the end cap 1410 are preferably made of materials that provide structural strength and rigidity. Such materials include, for example, steel, aluminum, magnesium, high-strength plastics, etc. In some embodiments, depending on the specific requirements of a given application of the technology, other materials might be appropriate. For example, the hub shell 138 may be made from composites, thermo plastics, thermoset plastics, etc.

Referring now to FIG. 14, the illustrated hub 1400 houses in its interior embodiments of the CVTs presented herein. A main shaft 105 supports the hub 1400 and provides for attachment to the dropouts 10 of a bicycle or other vehicle or equipment. The main shaft 105 of this embodiment is described in further detail with reference to FIGS. 41-43. In some embodiments, as illustrated in FIGS. 15-18, a CVT 1500 includes a shifting mechanism that incorporates a rod 112 with a threaded end 109. Nuts 106 and 107 lock the dropouts 10 to the main shaft 105. In the embodiment of FIG. 14, the hub 1400 includes a freewheel 1420 that is operationally coupled to an input shaft (see FIG. 33 and FIG. 40) for transferring a torque input into the CVT 1500. It should be noted that although various embodiments and features of the CVTs described here are discussed with reference to a bicycle application, through readily recognizable modifications the CVTs and features thereof can be used in any vehicle, machine or device that uses a transmission.

Figure 15:
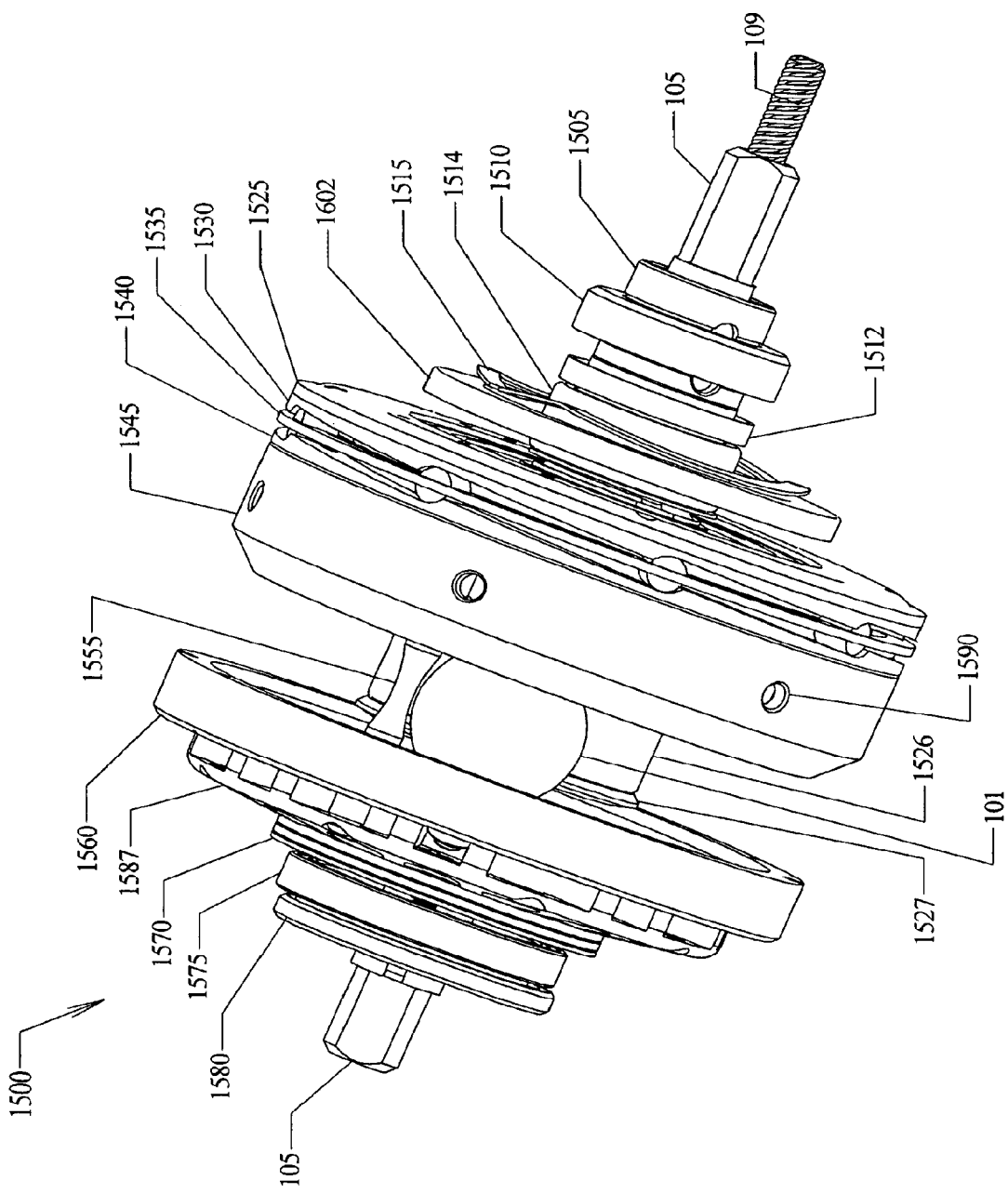
FIG. 15 is a top elevational view of various assemblies of an embodiment of a CVT incorporated in the bicycle hub of FIG. 14.
Figure 16:
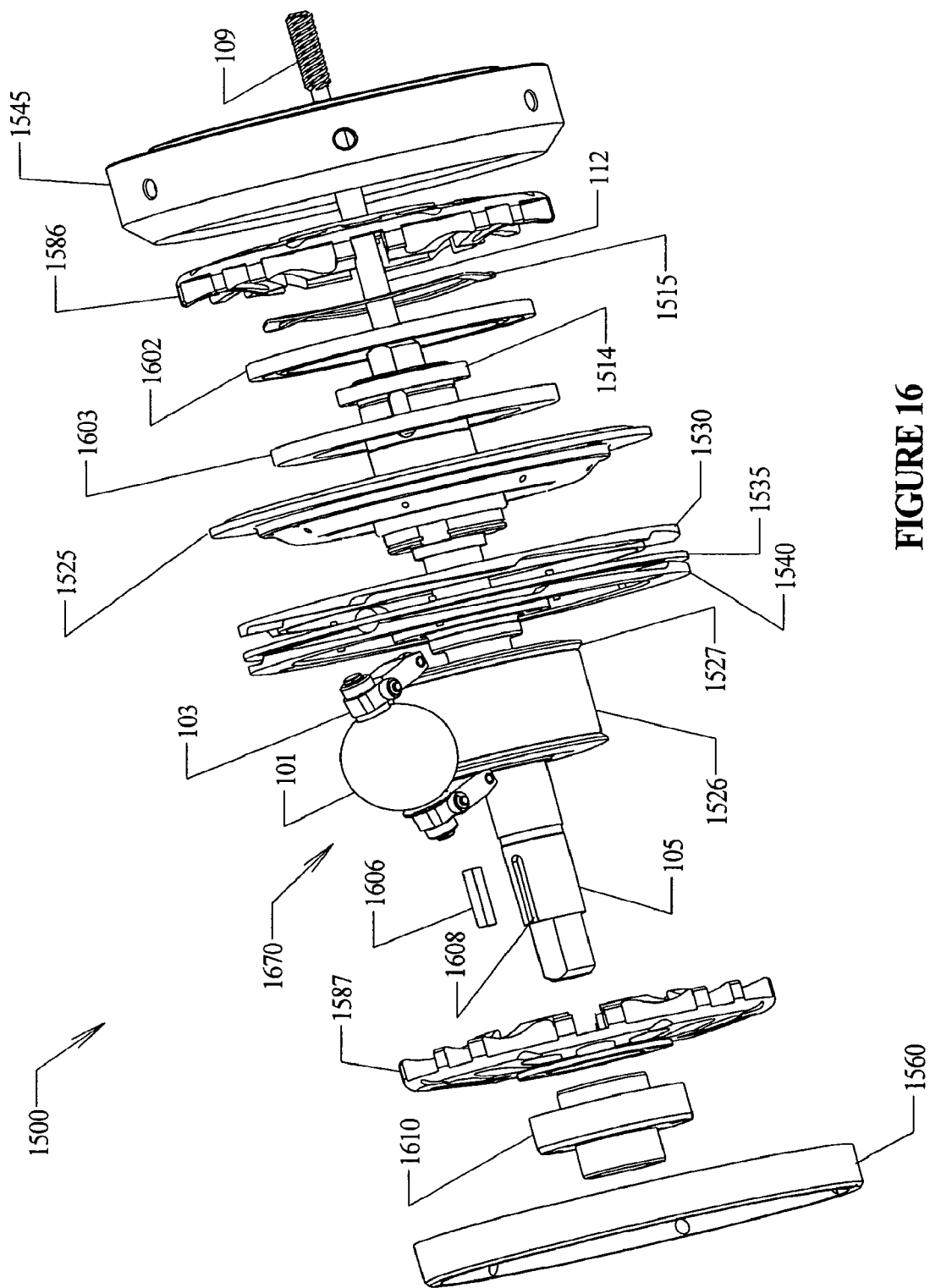
FIG. 16 is a partially exploded, perspective view of certain assemblies of the CVT of FIG. 15.
Figure 27:
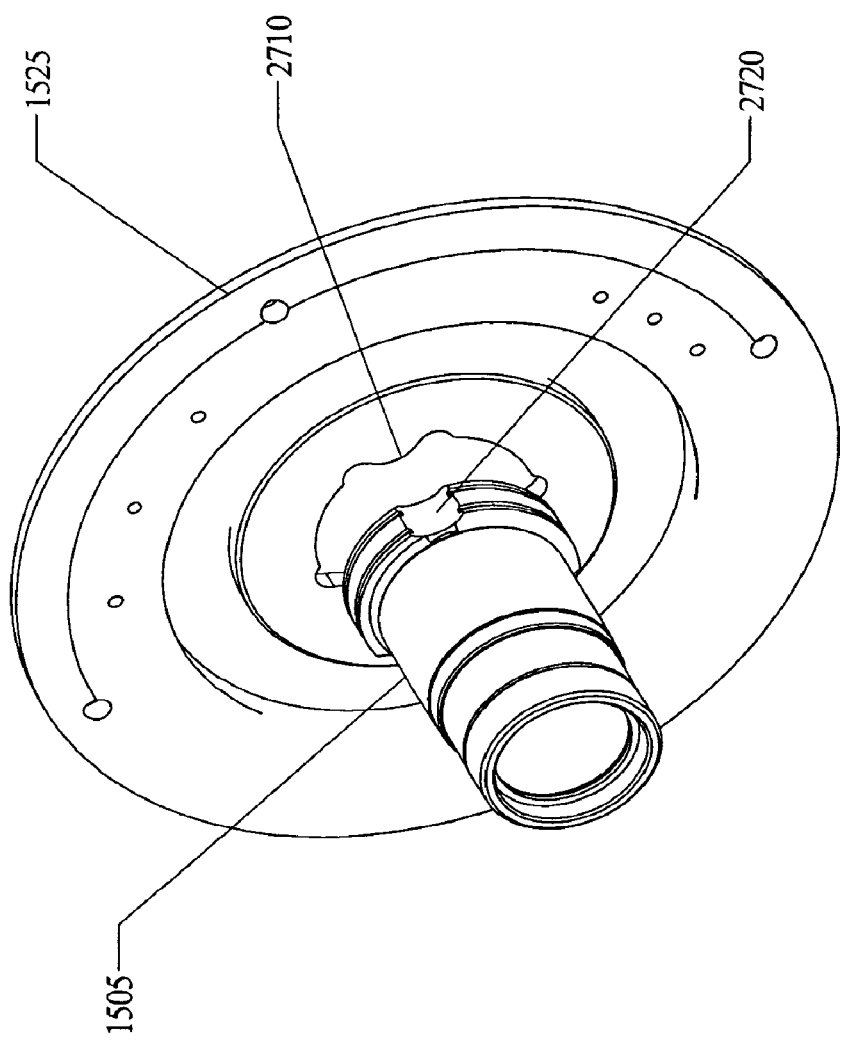
FIG. 27 is an exploded perspective view of a mating input shaft and torsion disc that can be used with the CVT of FIG. 15.

With reference to FIGS. 15 and 16, in one embodiment the CVT 1500 has an input disc 1545 for transferring torque to a set of spherical traction rollers (here shown as balls 101). FIG. 16 is a partially exploded view of the CVT 1500. The balls 101 transfer the torque to an output disc 1560. One ball 101 is illustrated in this embodiment to provide clarity in illustrating the various features of the CVT 1500, however, various embodiments of the CVT employ anywhere from 2 to 16 balls 101 or more depending on the torque, weight and size requirements of each particular application. Different embodiments use either 2, 3, 4, 5, 6, 7, 8, 9, 10, 11, 12, 13, 14, 15, 16 or more balls 101. An idler 1526, mounted coaxially about the main shaft 105, contacts and provides support for the balls 101 and maintains their radial position about the main shaft 105. The input disc 1545 of some embodiments, has lubrication ports 1590 to facilitate circulation of lubricant in the CVT 1500.

Figure 37:
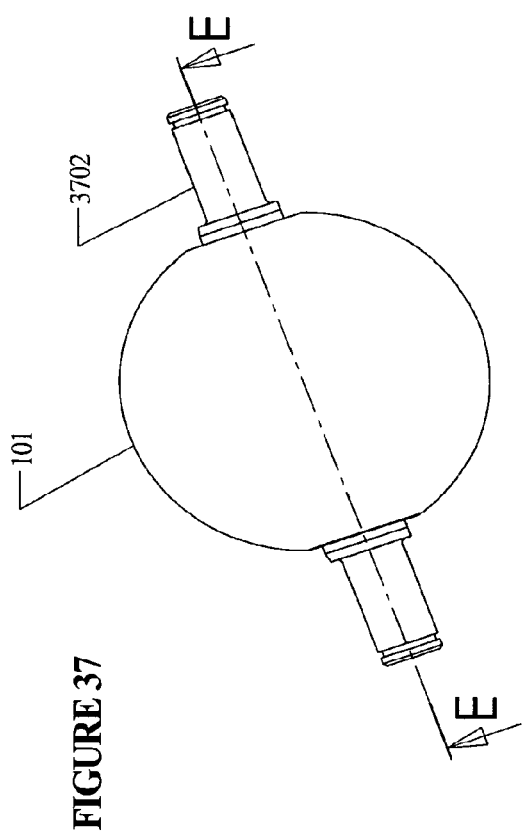
FIG. 37 is a top side elevational view of a ball and axle assembly that can be used with the CVT of FIG. 15.
Figure 38:
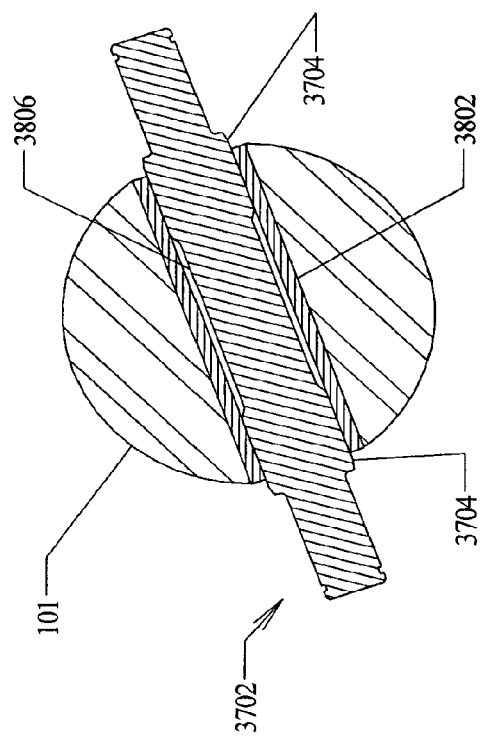
FIG. 38 is a cross-sectional view along section E-E of the ball and axle assembly of FIG. 37.

Referring additionally to FIGS. 37-38, the ball 101 spins on an axle 3702. Legs 103 and shift cams 1527 cooperate to function as levers that actuate a shift in the position of the axle 3702, which shift results in a tilting of the ball 101 and, thereby, a shift in the transmission ratio as already explained above. A cage 1589 (see FIGS. 22-24) provides for support and alignment of the legs 103 as the shift cams 1527 actuate a radial motion of the legs 103. In one embodiment, the cage includes stators 1586 and 1587 that are coupled by stator spacers 1555. In other embodiments, other cages 180, 389, 1200 are employed.

Figure 41:
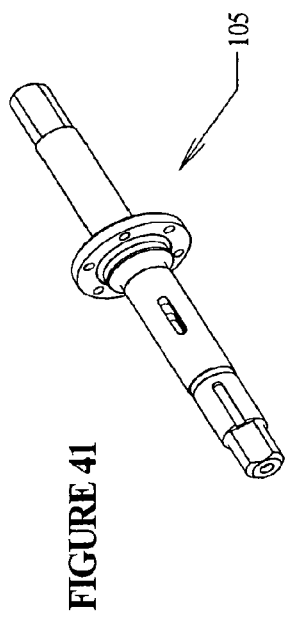
FIG. 41 is a perspective view of a main shaft that can be used with the CVT of FIG. 15.
Figure 42:
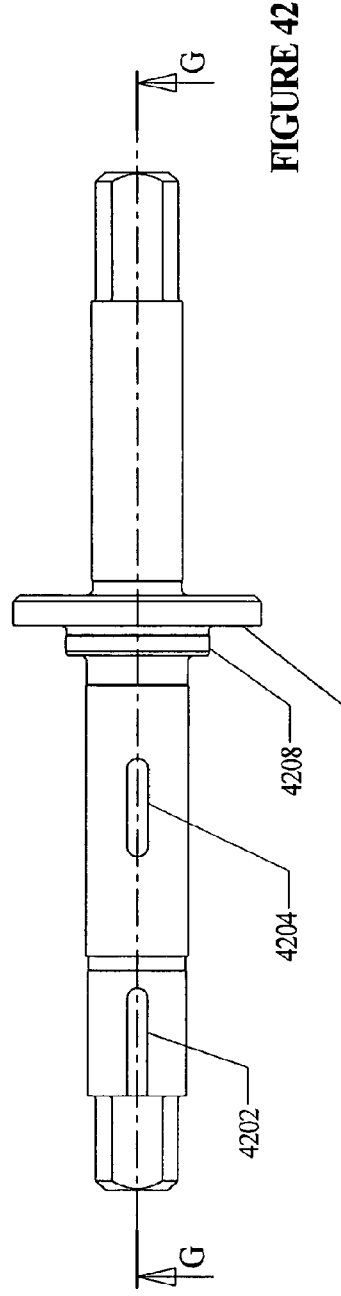
FIG. 42 is a top side elevational view of the main shaft of FIG. 41.
Figure 43:
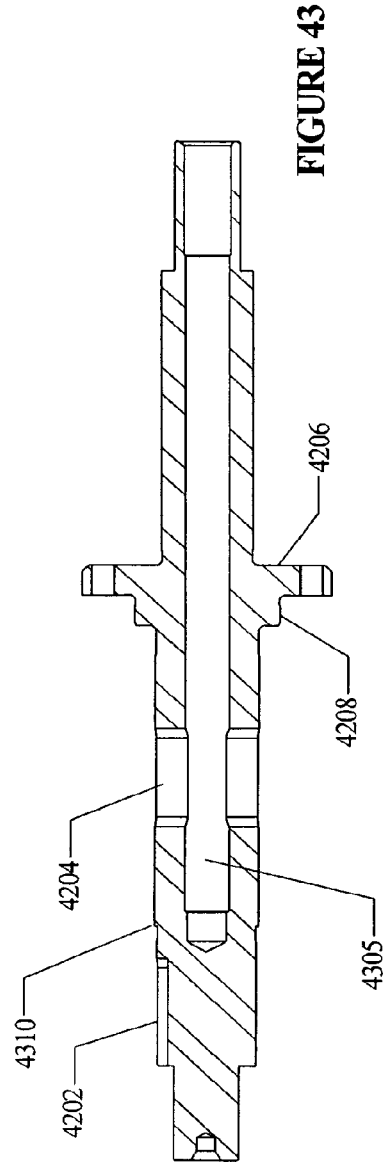
FIG. 43 is a cross-section view along section G-G of the main shaft of FIG. 42.

Referring additionally to FIGS. 41-43, in the illustrated embodiment, the cage 1589 mounts coaxially and nonrotatably about the main shaft 105. The stator 1586 rigidly attaches to a flange 4206 of the main shaft 105 in this embodiment. An additional flange 1610 holds the stator 1587 in place. A key 1606 couples the flange 1610 to the main shaft 105, which has a key seat 1608 for receiving the key 1606. Of course, the person of ordinary skill in the relevant technology will readily recognize that there are many equivalent and alternative methods for coupling the main shaft 105 to the flange 1610, or coupling the stators 1586, 1587 to the flanges 1620, 4206. In certain embodiments, the main shaft 105 includes a shoulder 4310 that serves to axially position and constrain the flange 1610.

The end cap 1410 mounts on a radial bearing 1575, which itself mounts over the flange 1610. In one embodiment, the radial bearing 1575 is an angular contact bearing that supports loads from ground reaction and radially aligns the hub shell 138 to the main shaft 105. In some embodiments, the hub 1400 includes seals at one or both ends of the main shaft 105. For example, here the hub 1400 has a seal 1580 at the end where the hub shell 138 and end cap 1410 couple together. Additionally, in order to provide an axial force preload on the output side and to maintain axial position of the hub shell 138, the hub 1400 may include spacers 1570 and a needle thrust bearing (not shown) between the stator 1587 and the radial bearing 1575. The spacers 1570 mount coaxially about the flange 1610. In some embodiments, the needle thrust bearing may not used, and in such cases the radial bearing 1575 may be an angular contact bearing adapted to handle thrust loads. The person of ordinary skill in the relevant technology will readily recognize alternative means to provide the function of carrying radial and thrust loads that the spacers 1570, needle thrust bearing, and radial bearing provide.

Still referring to FIGS. 14, 15 and 16, in the embodiment illustrated, a variator 1500 for the hub 1400 includes an input shaft 1505 that operationally couples at one end to a torsion disc 1525. The other end of the input shaft 1505 operationally couples to the freewheel 1420 via a freewheel carrier 1510. The torsion disc 1525 is configured to transfer torque to a load cam disc 1530 having ramps 3610 (see FIG. 36). The load cam disc 1530 transfers torque and axial force to a set of rollers 2504 (see FIG. 25), which act upon a second load cam disc 1540. The input disc 1545 couples to the second load cam disc 1540 to receive torque and axial force inputs. In some embodiments, the rollers 2504 are held in place by a roller cage 1535.

As is well known, many traction-type CVTs utilize a clamping mechanism to prevent slippage between the balls 101 and the input disc 1545 and/or output disc 1560 when transmitting certain levels of torque. Provision of a clamping mechanism is sometimes referred to here as generating an axial force, or providing an axial force generator. The configuration described above of the load cam disc 1530 acting in concert with the load cam 1540 through the rollers 2504 is one such axial force generating mechanism. However, as the axial force generating device or sub-assembly generates axial force in a CVT, reaction forces are also produced that are reacted in the CVT itself in some embodiments. Referring additionally to FIGS. 25 and 26, in the embodiment illustrated of the CVT 1500, the reaction forces are reacted at least in part by a thrust bearing having first and second races 1602 and 1603, respectively. In the illustrated embodiment, the bearing elements are not shown but may be balls, rollers, barreled rollers, asymmetrical rollers or any other type of rollers. Additionally, in some embodiments, one or both of the races 1602 are made of various bearing race materials such as steel, bearing steel, ceramic or any other material used for bearing races. The first race 1602 butts up against the torsion disc 1525, and the second race 1603 butts up against the hub cap 1460. The hub cap 1460 of the illustrated embodiment helps to absorb the reaction forces that the axial force mechanism generates. In some embodiments, axial force generation involves additionally providing preloaders, such as one or more of an axial spring such as a wave spring 1515 or a torsion spring 2502 (see description below for FIG. 25).

Referring to FIGS. 15-18, 22-24 and 43, certain subassemblies of the CVT 1500 are illustrated. The stator 1586 mounts on a shoulder 4208 of the main shaft 105 and butts up against the flange 4206 of the main shaft 105. The stator 1587 mounts on a shoulder 1810 of the flange 1610. Here, screws (not shown) attach the flange 4206 to the stator 1586 and attach the flange 1610 to the stator 1587, however, in other embodiments the stator 1587 threads onto the shoulder 1810, although the stator 1587 can be attached by any method or means to the shoulder 1810. Because the flanges 1610 and 4206 are nonrotatably fixed to main shaft 105, the cage 1589 made of the stators 1586 and 1587, among other things, attaches nonrotatably in this embodiment to the main shaft 105. The stator spacers 1555 provide additional structural strength and rigidity to the cage 1589. Additionally, the stator spacers 1555 aid in implementing the accurate axial spacing between stators 1586 and 1587. The stators 1586 and 1587 guide and support the legs 103 and axles 3702 through guide grooves 2202.

Referring now to FIGS. 15-21, 37, 38, the ball 101 spins about the axle 3702 and is in contact with an idler 1526. Bearings 1829, mounted coaxially about the main shaft 105, support the idler 1526 in its radial position, which bearings 1829 may be separate from or integral with the idler 1526. A shift pin 114, controlled by the shift rod 112, actuates an axial movement of the shift cams 1527. The shift cams 1527 in turn actuate legs 103, functionally resulting in the application of a lever or pivoting action upon the axle 3702 of the ball 101. In some embodiments, the CVT 1500 includes a retainer 1804 that keeps the shift pin 114 from interfering with the idler 1526. The retainer 1804 can be a ring made of plastic, metal, or other suitable material. The retainer 1804 fits between the bearings 1829 and mounts coaxially about a shift cam extension 1528.

FIGS. 19-21 show one embodiment of the shift cams 1527 for the illustrated CVT 1500. Each shift cam disc 1572 has a profile 2110 along which the legs 103 ride. Here the profile 2110 has a generally convex shape. Usually the shape of the profile 2110 is determined by the desired motion of the legs 103, which ultimately affects the shift performance of the CVT 1500. Further discussion of shift cam profiles is provided below. As shown, one of the shift cam discs 1527 has an extension 1528 that mounts about the main shaft 105. The extension 1528 of the illustrated embodiment is sufficiently long to extend beyond the idler 1526 and couple to the other shift cam disc 1527. Coupling here is provided by a slip-fit and a clip. However, in other embodiments, the shift cams 1527 can be fastened to each other by threads, screws, interference fit, or any other connection method. In some embodiments, the extension 1528 is provided as an extension from each shift cam 1527. The shift pin 114 fits in a hole 1910 that goes through the extension 1528. In some embodiments, the shift cams 1527 have orifices 1920 to improve lubrication flow through the idler bearings 1829. In some embodiments the idler bearings 1829 are press fit onto the extension 1528. In such embodiments, the orifices 1920 aid in removing the idler bearings 1829 from the extension 1528 by allowing a tool to pass through the shift cams 1527 and push the idler bearings 1829 off the extension 1528. In certain embodiments, the idler bearings 1829 are angle contact bearings, while in other embodiments they are radial bearings or thrust bearings or any other type of bearing. Many materials are suitable for making the shift cams 1527. For example, some embodiments utilize metals such as steel, aluminum, and magnesium, while other embodiments utilize other materials, such as composites, plastics, and ceramics, which depend on the conditions of each specific application.

The illustrated shift cams 1527 are one embodiment of a shift cam profile 2110 having a generally convex shape. Shift cam profiles usually vary according to the location of the contact point between the idler 1526 and the ball-leg assembly 1670 (see FIG. 16) as well as the amount of relative axial motion between the ball 101 and the idler 1526.

Referring now to the embodiment illustrated in FIGS. 16, and 18-21, the profile of shift cams 1527 is such that axial translation of the idler 1526 relative to the ball 101 is proportional to the change of the angle of the axis of the ball 101. The angle of the axis of the ball 101 is referred to herein as "gamma." The applicant has discovered that controlling the axial translation of the idler 1526 relative to the change in gamma influences CVT ratio control forces. For example, in the illustrated CVT 1500, if the axial translation of the idler 1526 is linearly proportional to a change in gamma, the normal force at the shift cams 1527 and ball-leg interface is generally parallel to the axle 3702. This enables an efficient transfer of horizontal shift forces to a shift moment about the ball-leg assembly 1670.

A linear relation between idler translation and gamma is given as idler translation is the mathematical product of the radius of the balls 101, the gamma angle and RSF (i.e., idler translation=ball radius*gamma angle*RSF), where RSF is a roll-slide factor. RSF describes the transverse creep rate between the ball 101 and the idler 126. As used here, "creep" is the discrete local motion of a body relative to another. In traction drives, the transfer of power from a driving element to a driven element via a traction interface requires creep. Usually, creep in the direction of power transfer is referred to as "creep in the rolling direction." Sometimes the driving and driven elements experience creep in a direction orthogonal to the power transfer direction, in such a case this component of creep is referred to as "transverse creep." During CVT operation, the ball 101 and idler 1526 roll on each other. When the idler is shifted axially (i.e., orthogonal to the rolling direction), transverse creep is imposed between the idler 1526 and the ball 101. An RSF equal to 1.0 indicates pure rolling. At RSF values less than 1.0, the idler 1526 translates slower than the ball 101 rotates. At RSF values greater than 1.0, the idler 1526 translates faster than the ball 101 rotates.

Still referring to the embodiments illustrated in FIGS. 16, and 18-21, the applicant has devised a process for layout of the cam profile for any variation of transverse creep and/or location of the interface between the idler 1526 and the ball-leg assembly 1570. This process generates different cam profiles and aids in determining the effects on shift forces and shifter displacement. In one embodiment, the process involves the use of parametric equations to define a two-dimensional datum curve that has the desired cam profile. The curve is then used to generate models of the shift cams 127. In one embodiment of the process, the parametric equations of the datum curve are as follows:

$$\text{theta}=2*\text{GAMMA\_MAX}*t-\text{GAMMA\_MAX}$$

$$x=\text{LEG}*\sin(\text{theta})-0.5*\text{BALL\_DIA}*RSF*\text{theta}*\text{pi}/180+0.5*\text{ARM}*\cos(\text{theta})$$

$$y=\text{LEG}*\cos(\text{theta})-0.5*\text{ARM}*\sin(\text{theta})$$

$$z=0$$

The angle theta varies from minimum gamma (which in some embodiments is −20 degrees) to maximum gamma (which in some embodiments is +20 degrees). GAMMA_MAX is the maximum gamma. The parametric range variable "t" varies from 0 to 1. Here "x" and "y" are the center point of the cam wheel 152 (see FIG. 18) with respect to an X-Y coordinate system 1800. The X-axis of the X-Y coordinate system 1800 is parallel with the longitudinal axis of the CVT 1500, and the Y-axis of the X-Y coordinate system is substantially aligned with a radial axis of the CVT 1500. The equations for x and y are parametric. "LEG" and "ARM" define the position of the interface between the ball-leg assembly 1670 and the idler 1526 and shift cams 1527. More specifically, LEG is the perpendicular distance between the axis of the ball axle 3702 of a ball-leg assembly 1670 to a line that passes through the centers of the two corresponding cam wheels 152 of that ball-leg assembly 1570, which is parallel to the ball axle 3702. ARM is the distance between centers of the cam wheels 152 of a ball-leg-assembly 1670.

RSF values above zero are preferred. The CVT 100 demonstrates an application of RSF equal to about 1.4. Applicant discovered that an RSF of zero dramatically increases the force required to shift the CVT. Usually, RSF values above 1.0 and less than 2.5 are preferred.

Still referring to the embodiments illustrated in FIGS. 16, and 18-21, in the illustrated embodiment of a CVT 100, there is a maximum RSF for a maximum gamma angle. For example, for gamma equals to +20 degrees an RSF of about 1.6 is the maximum. RSF further depends on the size of the ball 101 and the size of the idler 1526, as well as the location of the cam wheel 152.

In terms of energy input to shift the CVT, the energy can be input as a large displacement and a small force (giving a large RSF) or a small displacement and a large force (giving a small RSF). For a given CVT there is a maximum allowable shift force and there is also a maximum allowable displacement. Hence, a trade off offers designers various design options to be made for any particular application. An RSF greater than zero reduces the required shift force by increasing the axial displacement necessary to achieve a desired shift ratio. A maximum displacement is determined by limits of the particular shifting mechanism, such as a grip or trigger shift in some embodiments, which in some embodiments can also be affected or alternatively affected by the package limits for the CVT 100.

Energy per time is another factor. Shift rates for a given application may require a certain level of force or displacement to achieve a shift rate depending on the power source utilized to actuate the shift mechanism. For example, in certain applications using an electric motor to shift the CVT, a motor having a high speed at low torque would be preferred in some instances. Since the power source is biased toward speed, the RSF bias would be toward displacement. In other applications using hydraulic shifting, high pressure at low flow may be more suitable than low pressure at high flow. Hence, one would choose a lower RSF to suit the power source depending on the application.

Idler translation being linearly related to gamma is not the only desired relation. Hence, for example, if it is desired that the idler translation be linearly proportional to CVT ratio, then the RSF factor is made a function of gamma angle or CVT ratio so that the relation between idler position and CVT ratio is linearly proportional. This is a desirable feature for some types of control schemes.

FIGS. 22-24 show one example of a cage 1589 that can be used in the CVT 1500. The illustrated cage 1589 has two stators 1586 and 1587 coupled to each other by a set of stator spacers 1555 (only one is shown for clarity). The stator spacers 1555 in this embodiment fasten to the outer periphery of the stators 1586 and 1587. Here screws attach the spacers 1555 to the stators 1586 and 1587. However, the stators 1586 and 1587 and the spacers 1555 can be configured for other means of attachment, such as press fitting, threading, or any other method or means. In some embodiments, one end of the spacers 1555 is permanently affixed to one of the stators 1586 or 1587. In some embodiments, the spacers 1555 are made of a material that provides structural rigidity. The stators 1586 and 1587 have grooves 2202 that guide and support the legs 103 and/or the axles 3702. In certain embodiments, the legs 103 and/or axles 3702 have wheels (item 151 of FIG. 11 or equivalent of other embodiments) that ride on the grooves 2202.

FIG. 24 shows a side of the stator 1586 opposite to the grooves 2202 of the stator 1586. In this embodiment, holes 2204 receive the screws that attach the stator spacers 1555 to the stator 1586. Inner holes 2210 receive the screws that attach the stator 1586 to the flange 4206 of the main shaft 105. To make some embodiments of the stator 1586 lighter, material is removed from it as shown as cutouts 2206 in this embodiment. For weight considerations as well as clearance of elements of the ball-leg assembly 1670, the stator 1586 may also include additional cutouts 2208 as in this embodiment.

Figure 36:
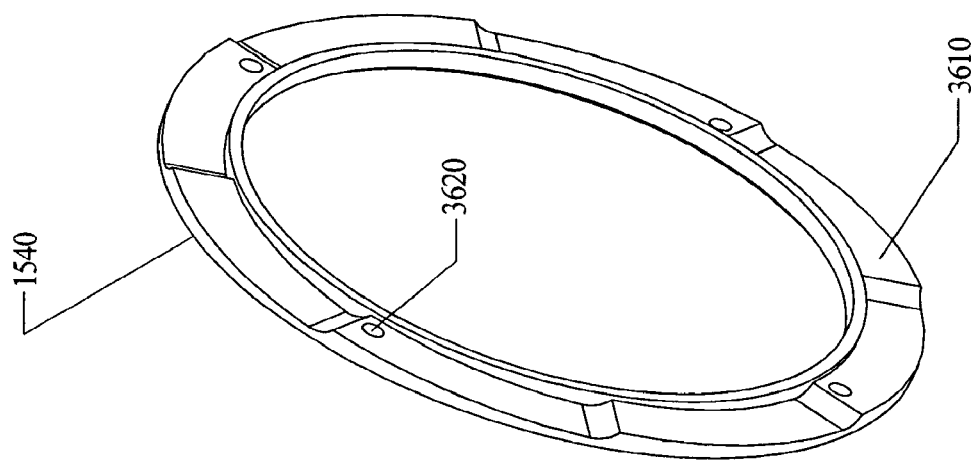
FIG. 36 is a perspective view of a load cam disc that can be used with the CVT of FIG. 15.

The embodiments of FIGS. 25, 26 and 36 will now be referenced to describe one embodiment of an axial force generation mechanism that can be used with the CVT 1500 of FIG. 15. FIGS. 25 and 26 are partially exploded views. The input shaft 1505 imparts a torque input to the torsion disc 1525. The torsion disc 1525 couples to a load cam disc 1530 that has ramps 3610. As the load cam disc 1530 rotates, the ramps 3610 activate the rollers 2504, which ride up the ramps 3610 of the second load cam disc 1540. The rollers 2504 then wedge in place, pressed between the ramps of the load cam discs 1530 and 1540, and transmit both torque and axial force from the load cam disc 1530 to the load cam disc 1540. In some embodiments, the CVT 1500 includes a roller retainer 1535 to ensure proper alignment of the rollers 2504. The rollers 2504 may be spherical, cylindrical, barreled, asymmetrical or other shape suitable for a given application. In some embodiments, the rollers 2504 each have individual springs (not shown) attached to the roller retainer 1535 or other structure that bias the rollers 2504 up or down the ramps 3610 as may be desired in some applications. The input disc 1545 in the illustrated embodiment is configured to couple to the load cam disc 1540 and receive both the input torque and the axial force. The axial force then clamps the balls 101 between the input disc 1545, the output disc 1560, and the idler 1526.

In the illustrated embodiment, the load cam disc 1530 is fastened to the torsion disc 1525 with dowel pins. However, other methods of fastening the load cam disc 1530 to the torsion disc 1525 can be used. Moreover, in some embodiments, the load cam disc 1530 is integral with the torsion disc 1525. In other embodiments, the torsion disc 1525 has the ramps 3610 machined into it to make a single unit for transferring torque and axial force. In the embodiment illustrated, the load cam disc 1540 couples to the input disc 1545 with dowel pins. Again, any other suitable fastening method can be used to couple the input disc 1545 to the load cam disc 1540. In some embodiments, the input disc 1545 and the load cam disc 1540 are an integral unit, effectively as if the ramps 3610 were built into the input disc 1545. In yet other embodiments, the axial force generating mechanism may include only one set of ramps 3610. That is, one of the load cam discs 1530 or 1540 does not have the ramps 3610, but rather provides a flat surface for contacting the rollers 2504. Similarly, where the ramps are built into the torsion disc 1525 or the input disc 1545, one of them may not include the ramps 3610. In load cam discs 1530, 1540 in both embodiments having ramps on both or on only one disc, the ramps 3610 and the flat surface on discs without ramps can be formed with a conformal shape conforming to the rollers 2504 surface shape to partially capture the rollers 2504 and to reduce the surface stress levels.

In some embodiments, under certain conditions of operation, a preload axial force to the CVT 1500 is desired. By way of example, at low torque input it is possible for the input disc 1545 to slip on the balls 101, rather than to achieve frictional traction. In the embodiment illustrated in FIGS. 25 and 26, axial preload is accomplished in part by coupling a torsion spring 2502 to the torsion disc 1525 and the input disc 1545. One end of the torsion spring 2502 fits into a hole 2930 (see FIG. 29) of the torsion disc 1545, while the other end of the torsion spring 2502 fits into a hole of the input disc 1545. Of course, the person of ordinary skill in the relevant technology will readily appreciate numerous alternative ways to couple the torsion spring 2502 to the input disc 1545 and the torsion disc 1525. In other embodiments, the torsion spring 2502 may couple to the roller retainer 1535 and the torsion disc 1525 or the input disc 1545. In some embodiments where only one of the torsion disc 1525 or input disc 1545 has ramps 3610, the torsion spring 2502 couples the roller retainer 1535 to the disc with the ramps.

Still referring to the embodiments illustrated in FIGS. 25 and 26, as mentioned before, in some embodiments the application of axial forces generates reaction forces that are reacted in the CVT 1500. In this embodiment of the CVT 1500, a ball thrust bearing aids in managing the reaction forces by transmitting thrust between the hub cap 1460 and the torsion disc 1525. The thrust bearing has a race 1602 that butts against the hub cap 1460, which in this embodiment has a recess near its inner bore for receiving the race 1602. The second race 1603 of the thrust bearing nests in a recess of the torsion disc 1525. In some embodiments, a wave spring 1515 is incorporated between the race 1602 and the hub 1460 to provide axial preload. In the illustrated embodiment, a bearing 2610 radially supports the hub cap 1460.

The applicant has discovered that certain configurations of the CVT 1500 are better suited than others to handle a reduction in efficiency of the CVT 1500 due to a phenomenon referred to herein as bearing drag recirculation. This phenomenon arises when a bearing is placed between the torsion disc 1525 and the hub cap 1460 to handle the reaction forces from axial force generation.

In some embodiments as illustrated in FIG. 1, a needle roller bearing having a diameter about equal to the diameter of the load cam disc 1530 is used to minimize the deflection of the end cap 160. In underdrive the speed of the torsion disc 157 (input speed) is greater than the speed of the end cap 160 (output speed). In underdrive the needle roller bearing (thrust bearing 163 in that embodiment) generates a drag torque opposite the direction of rotation of the torsion disc 1525. This drag torque acts on the torsion disc 1525 in the direction counter to the axial loading by the load cam disc 1530, and acts on the end cap 160 and thus the hub shell 138 and output disc 134 in the direction of the output tending to speed up the rotation of those components, these effects combining to unload the cam loader 154 thereby reduce the amount of axial force in the CVT 1500. This situation could lead to slip between or among the input disc 110, balls 101, and/or output disc 134.

In overdrive the speed of the torsion disc 1525 is greater than the speed of the end cap 160 and the needle bearing generates a drag torque acting on the torsion disc 1525 in the direction of the rotation of the torsion disc 1525 and acting on the end cap 160 against the output rotation of the end cap 160. This results in an increase in the axial force being generated in the CVT 1500. The increase in axial force then causes the system to generate even more drag torque. This feedback phenomenon between axial force and drag torque is what is referred to here as bearing drag recirculation, which ultimately results in reducing the efficiency of the CVT 100. Additionally, the drag torque acting against the end cap 160 acts as an additional drag on the output of the CVT 100 thereby further reducing its efficiency.

Figures 39, 40:
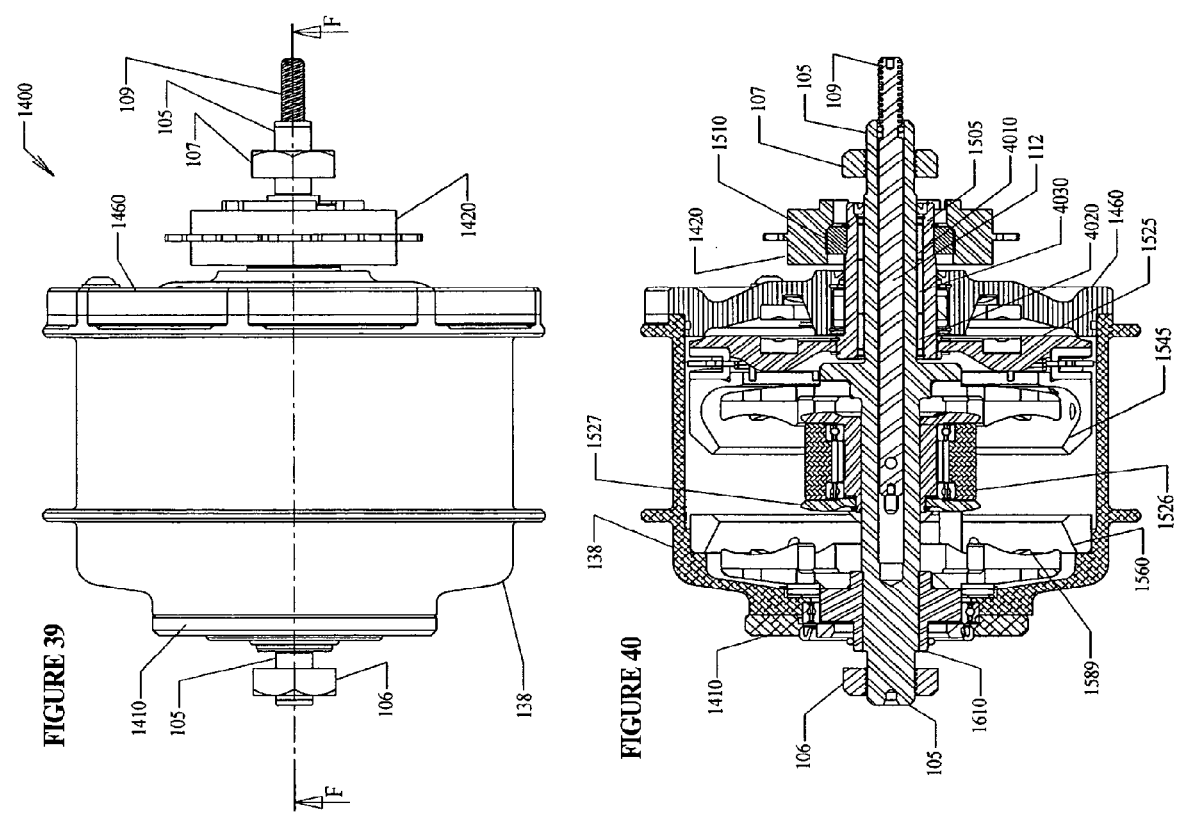

The applicant has discovered various systems and methods for minimizing efficiency losses due to bearing drag recirculation. As shown in FIGS. 25, 26, and 40, instead of using a needle roller bearing configured as described above, some embodiments the CVT 1500 employ a roller thrust bearing having races 1602 and 1603. Because the amount of drag torque increases with the diameter of the bearing used, the diameter of the races 1602 and 1603 is less than the diameter of the axial force generating load cam disc 1530 and in some embodiments is as small as possible. The diameter of the races 1602 and 1603 could be 10, 20, 30, 40, 50, 60, 70, 80, or 90 percent of the diameter of the load cam disc 1530. In some embodiments, the diameter of the races 1602 and 1603 is between 30 and 70 percent of the diameter of the load cam disc 1530. In still other embodiments, the diameter of the races 1602 and 1603 is between 40 and 60 percent of the diameter of the load cam disc 1530.

When a ball thrust bearing is used, in some embodiments the rollers and/or races are made of ceramic, the races are lubricated and/or superfinished, and/or the number of rollers is minimized while maintaining the desired load capacity. In some embodiments, deep groove radial ball bearings or angular contact bearings may be used. For certain applications, the CVT 1500 may employ magnetic or air bearings as means to minimize bearing drag recirculation. Other approaches to reducing the effects of bearing drag recirculation are discussed below, referencing FIG. 46, in connection with alternative embodiments of the input shaft 1505 and the main shaft 105.

FIGS. 27-35 depict examples of certain embodiments of a torque input shaft 1505 and a torsion disc 1525 that can be used with the CVT 1500 of FIG. 15. The input shaft 1505 and the torsion disc 1525 couple via a splined bore 2710 on the torsion disc 1525 and a splined flange 2720 on the input shaft 1525. In some embodiments, the input shaft 1505 and the torsion plate 1525 are one piece, made either as a single unit (as illustrated in FIG. 1) or wherein the input shaft 1505 and the torsion disc 1525 are coupled together by permanent attachment means, such as welding or any other suitable adhesion process. In yet other embodiments, the input shaft 1505 and the torsion disc 1525 are operationally coupled through fasteners such as screws, dowel pins, clips or any other means or method. The particular configuration shown here is preferable in circumstances where it is desired that the input shaft 1505 and the torsion disc 1525 be separate parts, which can handle misalignments and axial displacement due to load cam disc 1530 growth under load, as well as uncouple twisting moments via the splined bore 2710 and the splined shaft 2720. This configuration is also preferable in certain embodiments because it allows for lower manufacturing tolerances and, consequently, reduced manufacturing costs for a CVT.

Referencing FIGS. 16, 28-32, in the illustrated embodiment, the torsion disc 1525 is generally a circular disc having an outer periphery 3110 and a splined inner bore 2710. One side of the torsion disc 1525 has a recess 3205 that receives the race 1603 of a thrust bearing. The other side of the torsion disc 1525 includes a seat 3210 and a shoulder 3220 for receiving and coupling to the load cam disc 1530. The torsion disc 1525 includes a raised surface 3230 that rises from the shoulder 3220, reaches a maximum height in a convex shape, and then falls toward the inner bore 2710. In one embodiment of the CVT 1500, the raised surface 3230 partially supports and constrains the torsion spring 2502, while a set of dowel pins (not shown) helps to retain the torsion spring 2502 in place. In such embodiments, the dowel pins are placed in holes 2920. The torsion disc 1525 shown here has three splines on its splined bore 2710. However, in other embodiments the splines can be 1, 2, 3, 4, 5, 6, 7, 8, 9, 10, or more. In some embodiments, the number of splines is 2 to 7, and in others the number of splines is 3, 4, or 5.

In some embodiments, the torsion disc 1525 includes orifices 2910 for receiving dowels that couple the torsion disc 1525 to the load cam disc 1530. The torsion disc 1525 may also have orifices 2930 for receiving one end of the torsion spring 2502. In the illustrated embodiment, several orifices 2930 are present in order to accommodate different possible configurations of the torsion spring 2502 as well as to provide for adjustment of preload levels.

The torsion disc 1525 can be of any material of sufficient rigidity and strength to transmit the torques and axial loads expected in a given application. In some embodiments, the material choice is designed to aid in reacting the reaction forces that are generated. For example, hardened steels, steel, aluminum, magnesium, or other metals can be suitable depending on the application while in other applications plastics are suitable.

FIGS. 33-35 show an embodiment of an input torque shaft 1505 for use with the CVT 1500. The torque input shaft 1505 consists of a hollow, cylindrical body having a splined flange 2720 at one end and a key seat 3310 at the other end. In this embodiment, the key seat 3310 receives a key (not shown) that operationally couples the input shaft 1505 to a freewheel carrier 1510 (see FIG. 14, 15), which itself couples to the freewheel 1420. The surfaces 2720 and 3410 are shaped to mate with the splined bore 2710 of the torsion disc 1525. Thus, concave surfaces 2720 of some embodiments will preferably be equal in number to the splines in the splined bore 2710. In some embodiments, the concave surfaces 2720 may number 1, 2, 3, 4, 5, 6, 7, 8, 9, 10 or more. In some embodiments, the concave surfaces 2720 number 2 to 7, and in others there are 3, 4, or 5 concave surfaces 2720.

As shown, the input shaft 1505 has several clip grooves that help in retaining various components, such as bearings, spacers, etc., in place axially. The input shaft 1505 is made of a material that can transfer the torques expected in a given application. In some instances, the input shaft 1505 is made of hardened steel, steel, or alloys of other metals while in other embodiments it is made of aluminum, magnesium or any plastic or composite or other suitable material.

FIG. 36 shows an embodiment of a load cam disc 1540 (alternately 1530) that can be used with the CVT 1500. The disc 1540 is generally a circular ring having a band at its outer periphery. The band is made of ramps 3610. Some of the ramps 3610 have holes 3620 that receive dowel pins (not shown) for coupling the load cam disc 1530 to the torsion disc 1525 or the load cam disc 1540 to the input disc 1545. In some embodiments, the ramps 3610 are machined as a single unit with the load cam discs 1530, 1540. In other embodiments, the ramps 3610 may be separate from a ring substrate (not shown) and are coupled to it via any known fixation method. In the latter instance, the ramps 3610 and the ring substrate can be made of different materials and by different machining or forging methods. The load cam disc 1540 can be made, for example, of metals or composites.

Referencing FIG. 37 and FIG. 38, an embodiment of an axle 3702 consists of an elongated cylindrical body having two shoulders 3704 and a waist 3806. The shoulders 3704 begin at a point beyond the midpoint of the cylindrical body and extend beyond the bore of the ball 101. The shoulders 3704 of the illustrated embodiment are chamfered, which helps in preventing excessive wear of the bushing 3802 and reduces stress concentration. The ends of the axle 3702 are configured to couple to bearings or other means for interfacing with the legs 103. In some embodiments, the shoulders 3704 improve assembly of the ball-leg assembly 1670 by providing a support, stop, and/or tolerance reference point for the leg 103. The waist 3806 in certain embodiments serves as an oil reservoir. In this embodiment, a bushing 3802 envelops the axle 3702 inside the bore of the ball 101. In other embodiments, bearings are used instead of the bushing 3802. In those embodiments, the waist 3806 ends where the bearings fit inside the ball 101. The bearings can be roller bearings, drawn cup needle rollers, caged needle rollers, journal bearings, or bushings. In some embodiments, it is preferred that the bearings are caged needle bearings or other retained bearings. In attempting to utilize general friction bearings, the CVT 100, 1500 often fails or seizes due to a migration of the bearings or rolling elements of the bearings along the axles 3702, 102 out of the balls 101 to a point where they interfere with the legs 103 and seize the balls 101. It is believed that this migration is caused by force or strain waves distributed through the balls 101 during operation. Extensive testing and design has lead to this understanding and the Applicant's believe that the use of caged needle rollers or other retained bearings significantly and unexpectedly lead to longer life and improved durability of certain embodiments of the CVT 100, 1500. Embodiments utilizing bushings and journal material also aid in the reduction of failures due to this phenomenon. The bushing 3802 can be replaced by, for example, a babbitt lining that coats either or both of the ball 101 or axle 3702. In yet other embodiments, the axle 3702 is made of bronze and provides a bearing surface for the ball 101 without the need for bearings, bushing, or other linings. In some embodiments, the ball 101 is supported by caged needle bearings separated by a spacer (not shown) located in the middle portion of the bore of the ball 101. Additionally, in other embodiments, spacers mount on the shoulders 3704 and separate the caged needle bearings from components of the leg 103. The axle 3702 can be made of steel, aluminum, magnesium, bronze, or any other metal or alloy. In certain embodiments, the axle 3702 is made of plastic or ceramic materials.

One embodiment of the main shaft 105 is depicted in FIGS. 41-43. The main shaft 105 is an elongated body having an inner bore 4305 for receiving a shift rod 112 (see FIGS. 16 and 40). As implemented in the CVT 1500, the main shaft 105 is a single piece axle that provides support for many of the components of the CVT 1500. In embodiments where a single piece axle is utilized for the main shaft 105, the main shaft 105 reduces or eliminates tolerance stacks in certain embodiments of the CVT 1500. Furthermore, as compared with multiple piece axles, the single piece main shaft 105 provides greater rigidity and stability to the CVT 1500.

The main shaft 105 also includes a through slot 4204 that receives and allows the shift pin 114 to move axially, that is, along the longitudinal axis of the main shaft 105. The size of the slots 4204 can be chosen to provide shift stops for selectively determining a ratio range for a given application of the CVT 1500. For example, a CVT 1500 can be configured to have a greater underdrive range than overdrive range, or vice-versa, by choosing the appropriate dimension and/or location of the slots 4204. By way of example, if the slot 4204 shown in FIG. 42 is assumed to provide for the full shift range that the CVT 1500 is capable of, a slot shorter than the slot 4204 would reduce the ratio range. If the slot 4204 were to be shortened on the right side of FIG. 42, the underdrive range would be reduced. Conversely, if the slot 4204 were to be shortened on the left side of FIG. 42, the overdrive range would be reduced.

In this embodiment, a flange 4206 and a shoulder 4208 extend from the main shaft 105 in the radial direction. As already described, the flange 4206 and the shoulder 4208 facilitate the fixation of the stator 1586 to the main shaft 105. In some embodiments, the bore of the stator 1586 is sized to mount to the main shaft 105 such that the shoulder 4208 can be dispensed with. In other embodiments, the shoulder 4208 and/or the flange 4206 can be a separate part from the main shaft 105. In those instances, the shoulder 4208 and/or flange 4206 mount coaxially about the main shaft 105 and affix to it by any well known means in the relevant technology. In the embodiment depicted, the main shaft 105 includes a key seat 4202 for receiving a key 1606 that rotationally fixes the flange 1610 (see FIG. 16). The key 1606 may be a woodruff key. The main shaft 105 of some embodiments is made of a metal suitable in terms of manufacturability, cost, strength, and rigidity. For example, the main shaft can be made of steel, magnesium, aluminum or other metals or alloys.

The operation of the hub 1400 having one embodiment of the CVT 1500 described above will now be described with particular reference to FIGS. 39 and 40. The freewheel 1420 receives torque from a bicycle chain (not shown). Since the freewheel 1420 is fixed to the freewheel carrier 1510, the freewheel 1420 imparts the torque to the freewheel carrier 1510, which in turns transmits the torque to the input shaft 1505 via a key coupling (not shown). The input shaft 1505, riding on needle bearings 4010 and 4020 mounted on the main shaft 105, inputs the torque to the torsion disc 1525 via the splined bore 2710 and splined surfaces 2720 and 3410 of the input shaft 1505. Needle bearing 4010 is preferably placed near or underneath the freewheel carrier 1510 and/or freewheel 1420. This placement provides appropriate support to the input shaft 1505 to prevent transmission of radial loading from the freewheel carrier 1510 as a bending load through the CVT 1400. Additionally, in some embodiments a spacer 4030 is provided between the needle bearings 4010 and 4020. The spacer 4030 may be made of, for example, Teflon.

As the torsion disc 1525 rotates, the load cam disc 1530 coupled to the torsion disc 1525 follows the rotation and, consequently, the ramps 3610 energize the rollers 2504. The rollers 2504 ride up the ramps 3610 of the load cam disc 1540 and become wedged between the load cam disc 1530 and the load cam disc 1540. The wedging of the rollers 2504 results in a transfer of both torque and axial force from the load cam disc 1530 to the load cam disc 1540. The roller cage 1535 serves to retain the rollers 2504 in proper alignment.

Because the load cam disc 1540 is rigidly coupled to the input disc 1545, the load cam disc 1540 transfers both axial force and torque to the input disc 1545, which then imparts the axial force and torque to the balls 101 via frictional contact. As the input disc 1545 rotates under the torque it receives from the load cam disc 1540, the frictional contact between the input disc 1545 and the balls 101 forces the balls 101 to spin about the axles 3702. In this embodiment, the axles 3702 are constrained from rotating with the balls 101 about their own longitudinal axis; however, the axles 3702 can pivot or tilt about the center of the balls 101, as in during shifting.

The input disc 1545, output disc 1560, and idler 1526 are in frictional contact with the balls 101. As the balls 101 spin on the axles 3702, the balls 101 impart a torque to the output disc 1560, forcing the output disc 1560 to rotate about the shaft 105. Because the output disc 1560 is coupled rigidly to the hub shell 138, the output disc 1560 imparts the output torque to the hub shell 138. The hub shell 138 is mounted coaxially and rotatably about the main shaft 105. The hub shell 138 then transmits the output torque to the wheel of the bicycle via well known methods such as spokes.

Still referring to FIGS. 39 and 40, shifting of the ratio of input speed to output speed, and consequently a shift in the ratio of input torque to output torque, is accomplished by tilting the rotational axis of the balls 101, which requires actuating a shift in the angle of the axles 3702. A shift in the transmission ratio involves actuating an axial movement of the shift rod 112 in the main shaft 105, or in rotation of the shift rod 312 of FIG. 3. The shift rod 112 translates axially the pin 114, which is in contact with the shift cams 1527 via the bore 1910 in the extension 1528. The axial movement of the shift pin 114 causes a corresponding axial movement of the shift cams 1527. Because the shift cams 1527 engage the legs 103 (via cam wheels 152, for example), the legs 103 move radially as the legs 103 move along the shift cam profile 2110. Since the legs 103 are connected to the axles 3702, the legs 103 act as levers that pivot the axles 3702 about the center of the balls 101. The pivoting of the axles 3702 causes the balls 101 to change axis of rotation and, consequently, produce a ratio shift in the transmission.

FIG. 44 and FIG. 45 show an embodiment of a CVT 4400 having an axial force generating mechanism that includes one load cam disc 4440 acting on the input disc 1545 and another load cam disc 4420 acting on the output disc 1560. In this embodiment, the load cam discs 4440 and 4420 incorporate ramps such as ramps 3610 of the load cam discs 1530 and 1540. In this embodiment, neither of the input disc 1545 or the output disc 1560 has ramps or is coupled to discs with ramps. However, in other embodiments, it may be desirable to provide one or both of the input disc 1545 or output disc 1560 with discs having ramps, or building the ramps into the input disc 1545 and/or output disc 1560 to cooperate with the load cam discs 4420, 4440. The CVT 4400 of some embodiments further includes a roller retainer 4430 to house and align a set of rollers (not shown) that is between the load cam disc 4420 and the output disc 1560. In the embodiment shown, the roller retainer 4430 radially pilots on the output disc 1560. Similarly, there is a roller retainer 4410 between the load cam disc 4440 and the input disc 1545. The rollers and discs described with reference to these embodiments can be of any type or shape as described above for previous axial force generating devices. In some embodiments the angles of the ramps incline from the surface of the disc at an angle that is (or is between) 1, 2, 3, 4, 5, 6, 7, 8, 9, 10, 11, 12, 13, 14, 15 degrees or more or any portion between any of these.

Figure 46:
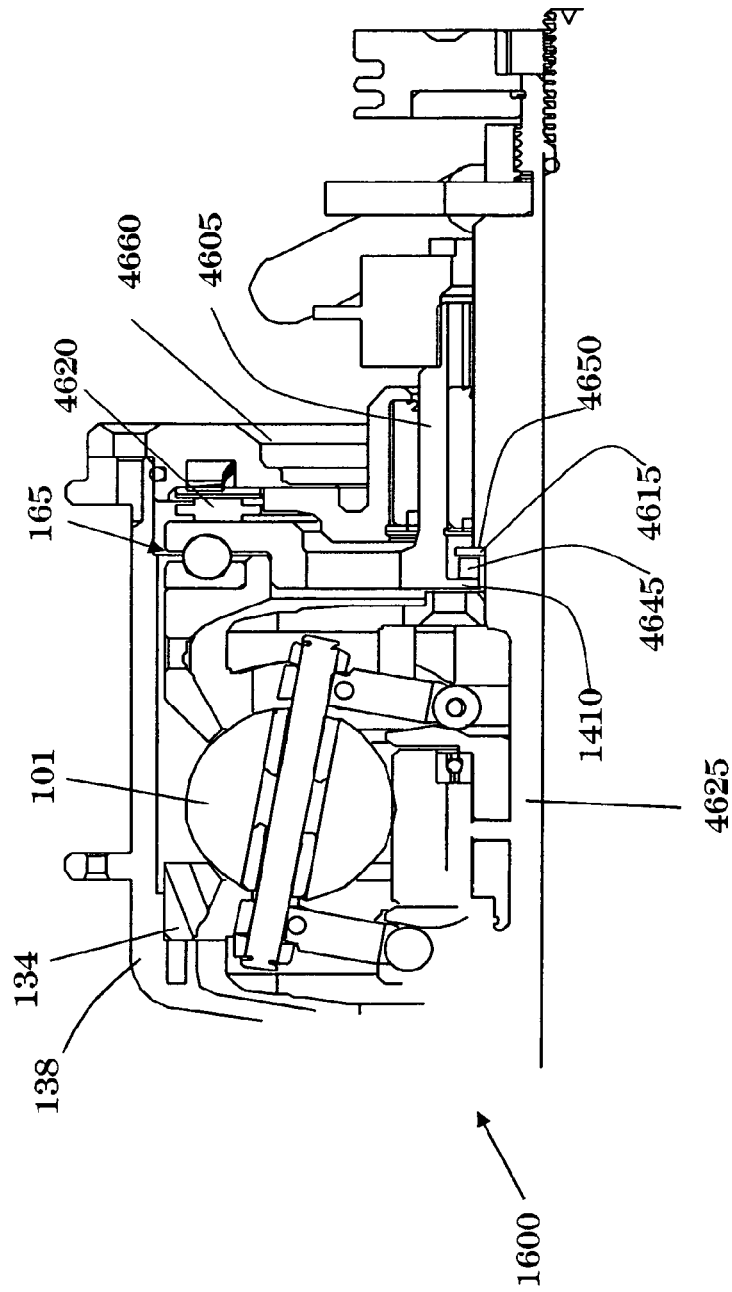
FIG. 46 is a cross-sectional view of a CVT that can be used with the bicycle hub of FIG. 14.

FIG. 46 illustrates an embodiment of a CVT 1600 having an input shaft 4605 and a main shaft 4625 adapted to decrease bearing drag recirculation effects. The CVT 100 includes an axial force generator 165 which generates an axial force that is reacted in part by a needle roller bearing 4620. A hub cap 4660 reacts drag torque and axial forces from the needle roller bearing 4620. In other embodiments, the needle roller bearing 4620 is replaced by a ball thrust bearing and in other embodiments the ball thrust bearing has a diameter smaller than the diameter of the needle roller bearing 4620.

In this embodiment, the main shaft 4625 has a shoulder 4650 that provides a reaction surface for a washer 4615, which can also be a clip, for example (all of which are integral in some embodiments). The input shaft 4605 is fitted with an extension 1410 that reacts against a bearing 4645. The bearing 4645 can be a thrust bearing. As shown, the input shaft 4605 and driver disc (similar to the torsion disc 1525) are a single piece. However, in other embodiments the input shaft 4605 may be coupled to a torsion disc 1525, for example, by threading, keying, or other fastening means. In the illustrated embodiment, some of the reaction force arising from the generation of axial force is reacted to the main shaft 4625, thereby reducing bearing drag recirculation. In yet another embodiment (not shown), the extension 1410 is reacted against angular thrust bearings that also support the input shaft 4605 on the main shaft 4625. In this latter embodiment, the shoulder 4650 and washer 4615 are not required. Rather, the main shaft 4625 would be adapted to support and retain the angular thrust bearings.

In many embodiments described herein, lubricating fluids are utilized to reduce friction of the bearings supporting many of the elements described. Furthermore, some embodiments benefit from fluids that provide a higher coefficient of traction to the traction components transmitting torque through the transmissions. Such fluids, referred to as "traction fluids" suitable for use in certain embodiments include commercially available Santotrac 50, 5CST AF from Ashland oil, OS#155378 from Lubrizol, IVT Fluid #SL-2003B21-A from Exxon Mobile as well as any other suitable lubricant. In some embodiments the traction fluid for the torque transmitting components is separate from the lubricant that lubricates the bearings.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A shift cam disc for facilitating a ratio shift of a continuously variable transmission ("CVT"), the CVT having a longitudinal axis and a ball-leg assembly, wherein the ball-leg assembly is provided with a ball coupled to a set of legs, each leg coupled to a cam wheel, the shift cam disc comprising:
a surface following the x and y values of the datum curve according to a set of parametric equations of the form:

$$theta = 2*gamma\_max*t - gamma\_max$$

$$x = LEG*\sin(theta) - 0.5*ball\_dia*RSF*theta*pi/180 + 0.5*ARM*\cos(theta)$$

$$y = LEG*\cos(theta) - 0.5*ARM*\sin(theta)$$

wherein theta is a variable representing a tilt angle of the ball-leg assembly, gamma_max is a variable representing a maximum tilt angle of the ball-leg assembly, t is a parametric range variable, x and y are variables representing a center point with respect to an x-y coordinate system of the cam wheel, wherein an x-axis is substantially parallel to the longitudinal axis, LEG is a variable representing a perpendicular distance between a centerline of the ball and a centerline of the cam wheels, ball_dia is a variable representing a dimension of the ball, RSF is a variable representing a roll-slide factor, and ARM is a variable representing a distance between the cam wheels.

2. The shift cam disc of claim 1, wherein gamma_max is an angle value between 15 and 30 degrees.

3. The shift cam disc of claim 1, wherein RSF is greater than 1.0.

4. The shift cam disc of claim 1, wherein RSF is less than 2.5.

5. The shift cam disc of claim 1, wherein gamma is a variable representing the tilt angle of the ball-leg assembly, gamma having a minimum value less than −20°.

6. The shift cam disc of claim 5, wherein value for gamma is greater than +20°.

7. The shift cam disc of claim 1, wherein the RSF factor is a function of CVT ratio such that the relation between the idler position of the CVT and the CVT ratio is linearly proportional.

8. A method of manufacturing a shift cam disc for facilitating a ratio shift of a continuously variable transmission ("CVT"), the CVT having a longitudinal axis and a ball-leg assembly, wherein the ball-leg assembly is provided with a ball coupled to a set of legs, each leg coupled to a cam wheel, the method comprising:
generating a datum curve according to a set of parametric equations of the form:

$$theta = 2*gamma\_max*t - gamma\_max$$

$$x = LEG*\sin(theta) - 0.5*ball\_dia*RSF*theta*pi/180 + 0.5*ARM*\cos(theta)$$

$$y = LEG*\cos(theta) - 0.5*ARM*\sin(theta)$$

wherein theta is a variable representing a tilt angle of the ball-leg assembly, gamma_max is a variable representing a maximum tilt angle of the ball-leg assembly, t is a parametric range variable, x and y are variables representing a center point with respect to an x-y coordinate system of the cam wheel, wherein an x-axis is substantially parallel to the longitudinal axis, LEG is a variable representing a perpendicular distance between a centerline of the ball and a centerline of the cam wheels, ball_dia is a variable representing a dimension of the ball, RSF is a variable representing a roll-slide factor, and ARM is a variable representing a distance between the cam wheels, and forming a shift cam disc surface according to the x and y values of the datum curve.

9. The method of claim 8, wherein gamma_max is an angle value between 15 and 30 degrees.

10. The method of claim 8, wherein RSF is greater than 1.0.

11. The method of claim 8, wherein RSF is less than 2.5.

12. The method of claim 8, wherein gamma is a variable representing the tilt angle of the ball-leg assembly, gamma having a minimum value less than −20°.

13. The method of claim 12, wherein a maximum value for gamma is greater than +20°.

14. The method of claim 8, wherein the RSF factor is a function of CVT ratio such that the relation between the idler position of the CVT and the CVT ratio is linearly proportional.

15. A method for generating cam profiles for facilitating a ratio shift of a continuously variable transmission ("CVT"), the CVT having a longitudinal axis and a ball-leg assembly, wherein the ball-leg assembly is provided with a ball coupled to a set of legs, each leg coupled to a cam wheel, the method comprising:

determining a desired shift force in comparison to a shifter displacement; and generating a datum curve that corresponds to the desired shift force in comparison to the shifter displacement according to a set of parametric equations of the form:

$$theta = 2*gamma\_max*t - gamma\_max$$

$$x = LEG*\sin(theta) - 0.5*ball\_dia*RSF*theta*pi/180 + 0.5*ARM*\cos(theta)$$

$$y = LEG*\cos(theta) - 0.5*ARM*\sin(theta)$$

wherein theta is a variable representing a tilt angle of the ball-leg assembly, gamma_max is a variable representing a maximum tilt angle of the ball-leg assembly, t is a parametric range variable, x and y are variables representing a center point with respect to an x-y coordinate system of the cam wheel, wherein an x-axis is substantially parallel to the longitudinal axis, LEG is a variable representing a perpendicular distance between a centerline of the ball and a centerline of the cam wheels, ball_dia is a variable representing a dimension of the ball, RSF is a variable representing a roll-slide factor, and ARM is a variable representing a distance between the cam wheels.

16. The method of claim 15, wherein gamma_max is an angle value between 15 and 30 degrees.

17. The method of claim 15, wherein RSF is greater than 1.0.

18. The method of claim 15, wherein RSF is less than 2.5.

19. The method of claim 15, wherein gamma is a variable representing the tilt angle of the ball-leg assembly, gamma having a minimum value less than −20°.

20. The method of claim 19, wherein a maximum value for gamma is greater than +20°.

21. The method of claim 15, wherein the RSF factor is a function of CVT ratio such that the relation between the idler position of the CVT and the CVT ratio is linearly proportional.

* * * * *

UNITED STATES PATENT AND TRADEMARK OFFICE
CERTIFICATE OF CORRECTION

PATENT NO. : 7,976,426 B2  
APPLICATION NO. : 11/842050  
DATED : July 12, 2011  
INVENTOR(S) : Robert A Smithson et al.

Page 1 of 1

It is certified that error appears in the above-identified patent and that said Letters Patent is hereby corrected as shown below:

Col. 23, line 57, Change In Claim 1, after "(theta)" insert --;--.

Col. 23, line 59, Change In Claim 1, after "(theta)" insert --;--.

Col. 24, line 33, Change In Claim 8, after "(theta)" insert --;--.

Col. 24, line 36, Change In Claim 8, after "(theta)" insert --;--.

Col. 25, line 12, Change In Claim 15, after "(theta)" insert --;--.

Col. 25, line 14, Change In Claim 15, after "(theta)" insert --;--.

Signed and Sealed this  
Twenty-eighth Day of August, 2012

David J. Kappos  
*Director of the United States Patent and Trademark Office*